United States Patent
Goettsche

[19]

[11] Patent Number: 6,100,903
[45] Date of Patent: Aug. 8, 2000

[54] METHOD FOR GENERATING AN ELLIPSE WITH TEXTURE AND PERSPECTIVE

[76] Inventor: Mark T Goettsche, 610 May Ave., Santa Cruz, Calif. 95060

[21] Appl. No.: 08/698,908

[22] Filed: Aug. 16, 1996

[51] Int. Cl.[7] ...................................................... G06T 11/00
[52] U.S. Cl. ............................................................. 345/442
[58] Field of Search ........................... 345/433, 440–443, 345/425, 419, 420

[56] References Cited

PUBLICATIONS

Foley et al. "Computer Graphics Principles and Practice" Second Edition pp. 945–975, 30–33, 1990.

*Primary Examiner*—Almis R. Jankus

[57] ABSTRACT

A method for generating a circular or elliptical arc on a digital computer display (FIG. 1). An ellipse can be generated in two dimensions (FIG. 5) or three dimensions with perspective (FIG. 13). The ellipse dimensions form angle meters (FIG. 4) that provide rotational angle information for a screen point moving along the elliptical curve (FIG. 3). Pixels are colored and antialiased with a texture table (FIG. 2). The drawing loops for two dimensions (FIG. 6) and three dimensions (FIG. 14) are computationally simple and suitable for implementation in a custom designed, dedicated computer circuit. The three dimensional perspective drawing employs a depth constant that fits the curve to the perspective field of view (FIG. 8). As the curve depth changes, the depth constant directs the rescaling of the ellipse (FIG. 11).

10 Claims, 15 Drawing Sheets

Pixel generator drawing an ellipse in 2D.

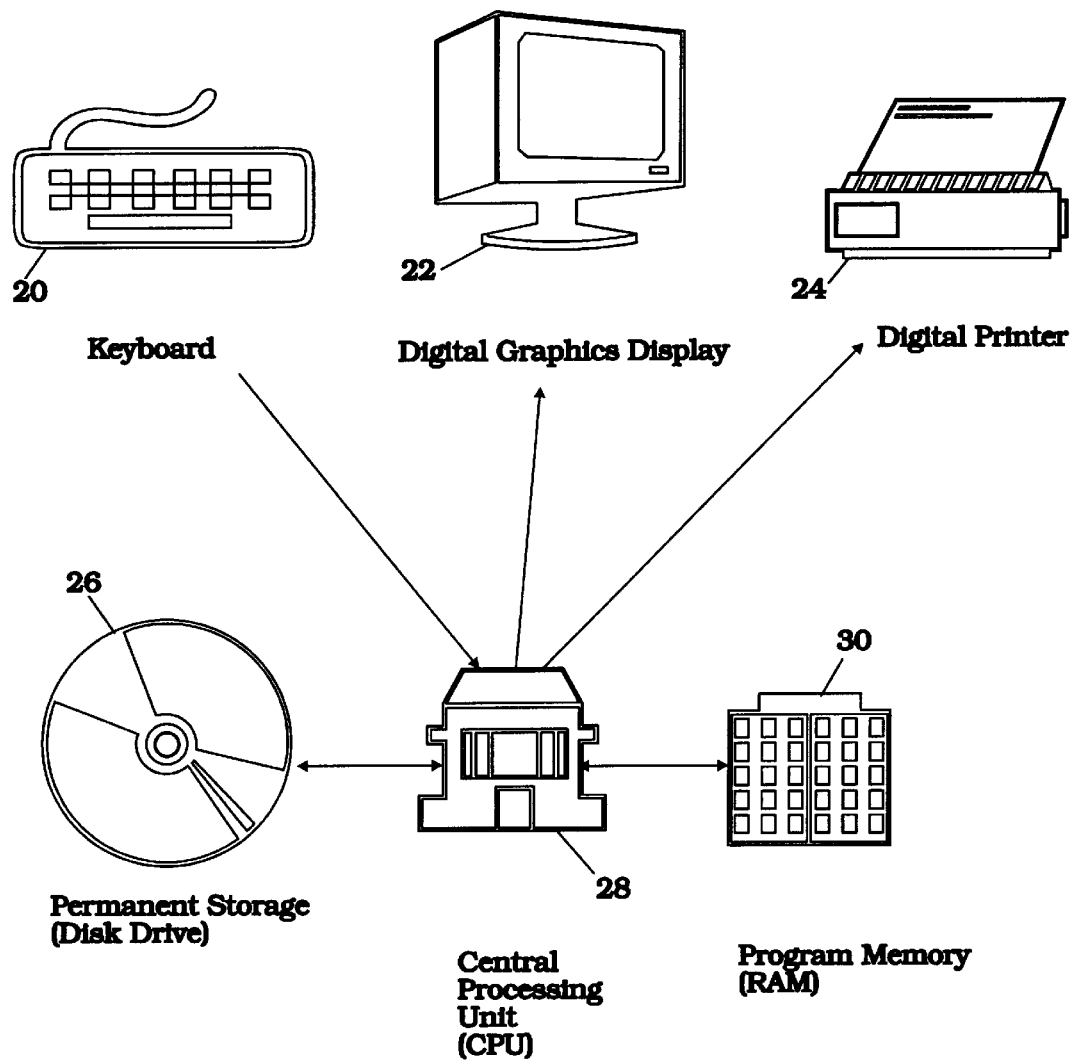
Fig. 1. Computer system for rendering an ellipse.

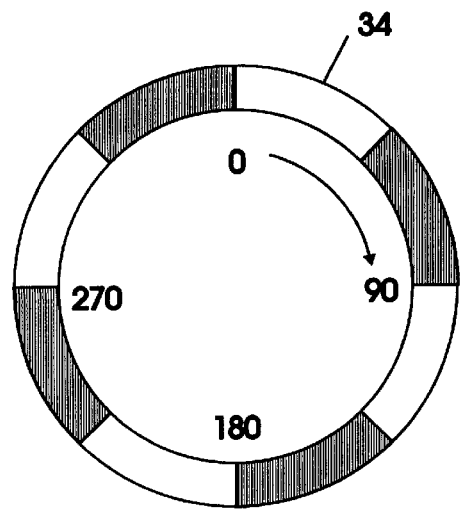
Fig. 2A Sample texture map drawn on a circle.
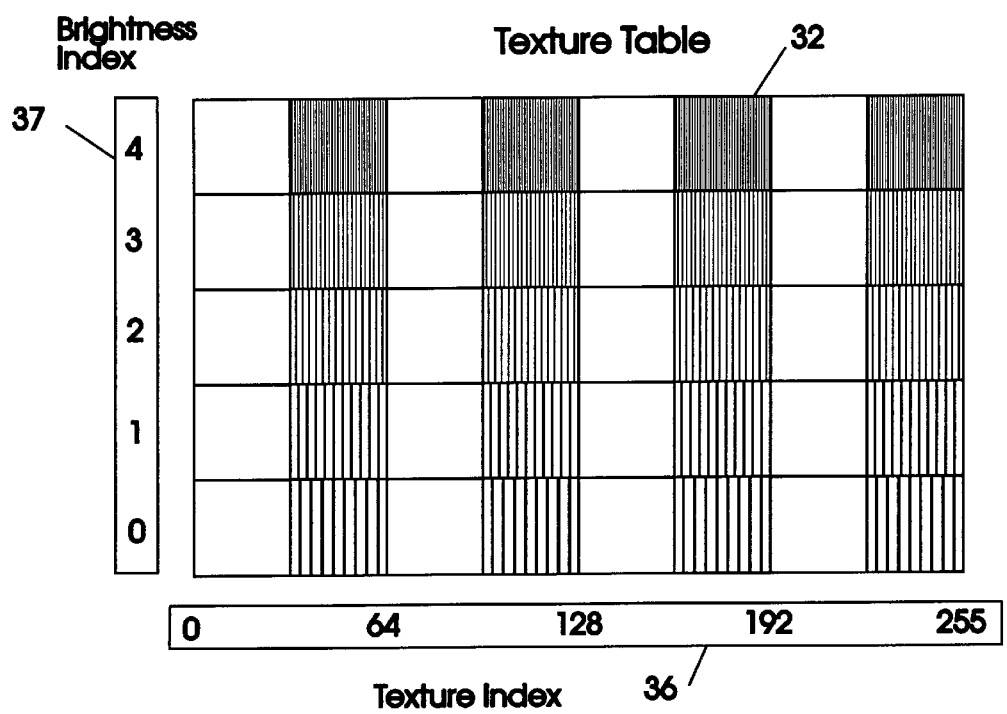
Fig. 2B Sample texture map indexed by rotation angle.

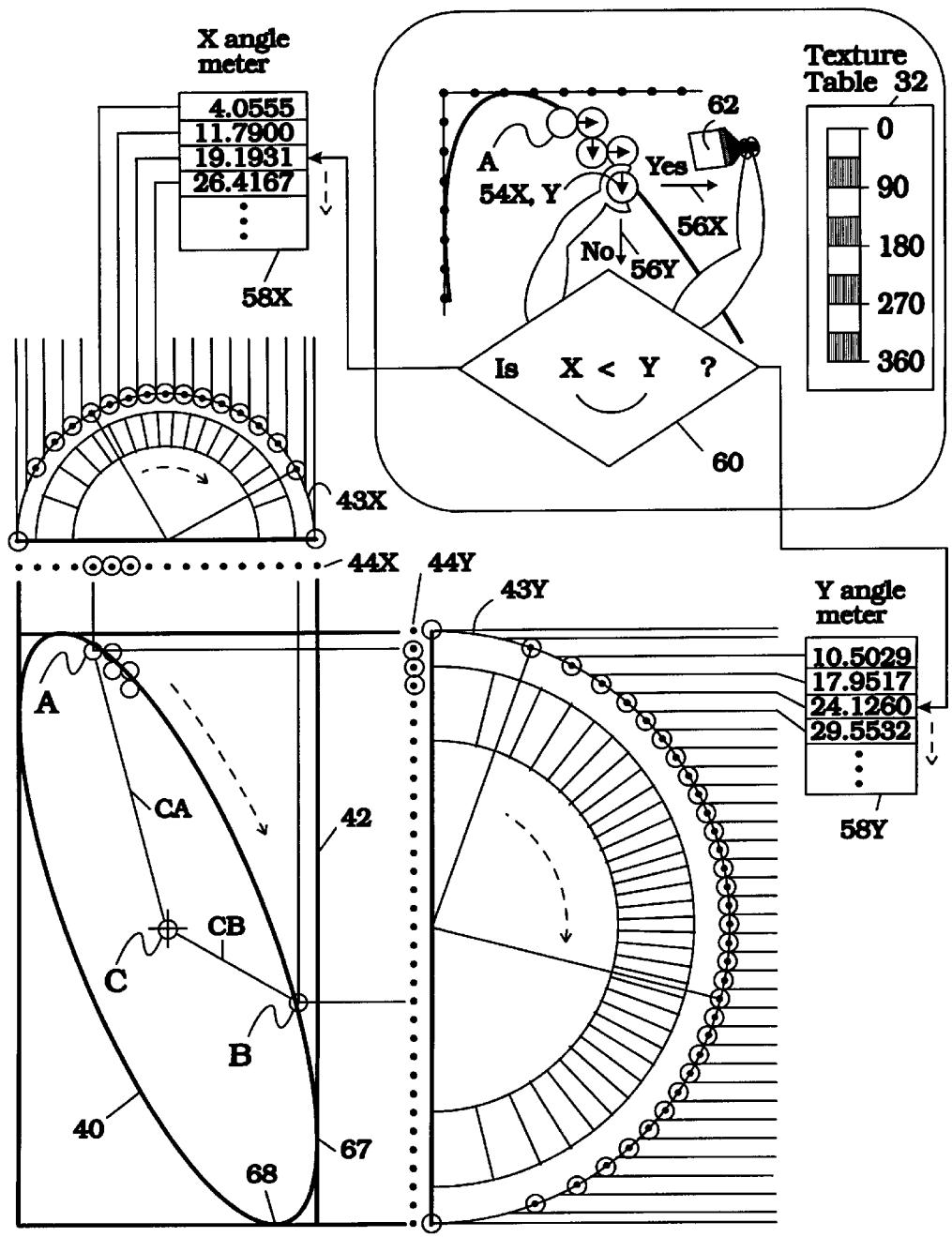
Fig. 3. Pixel generator drawing an ellipse in 2D.

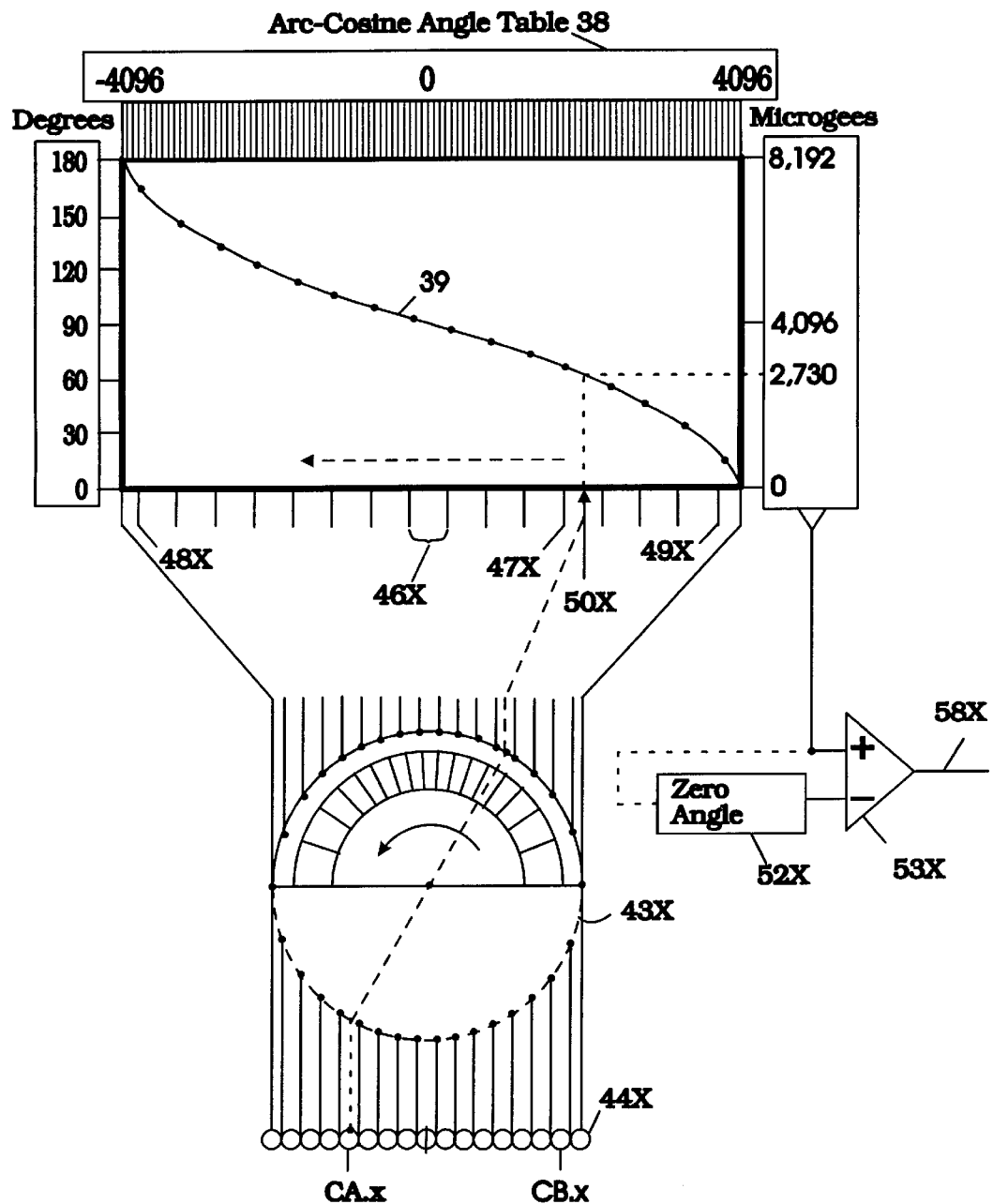
Fig. 4. Detailed view of the X angle meter 58X

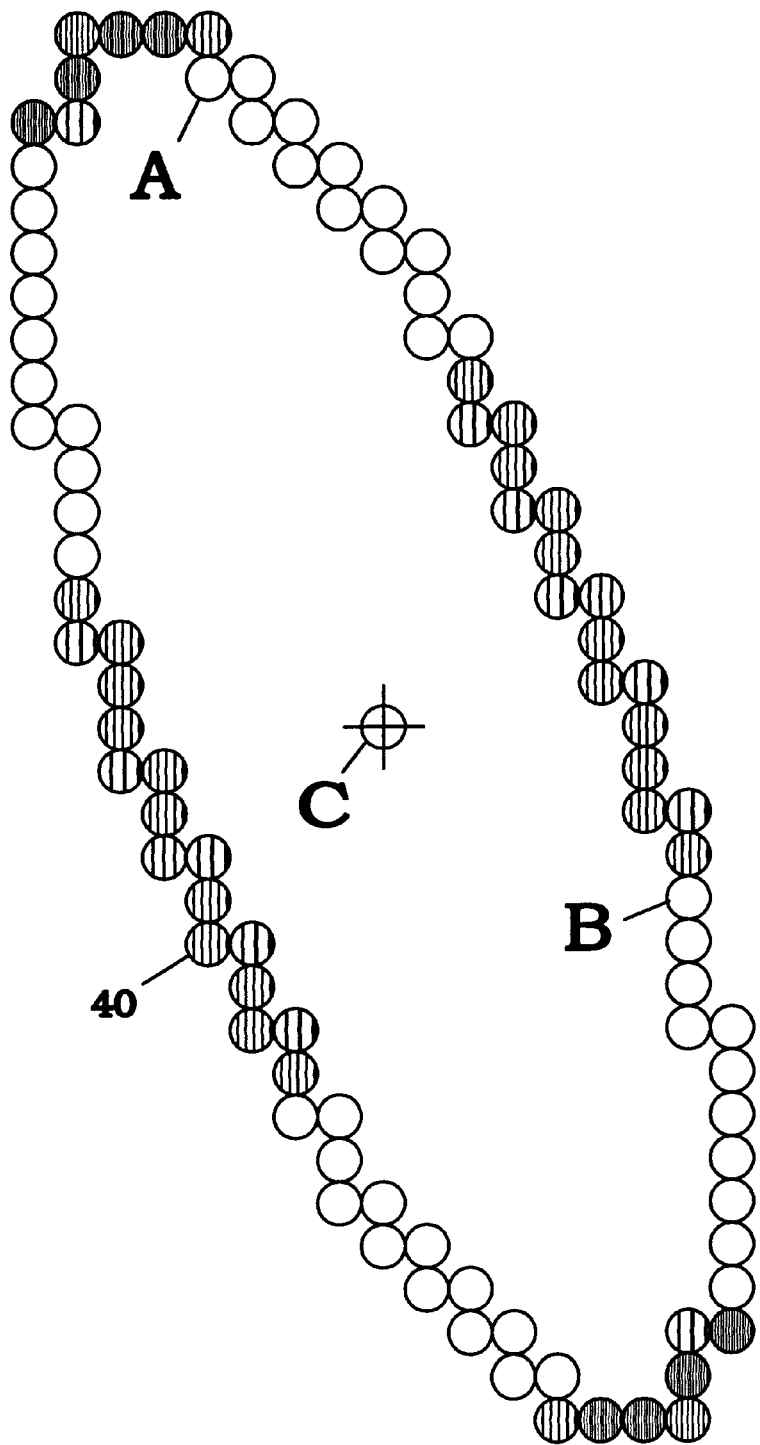
Fig. 5. Ellipse drawn in 2D.

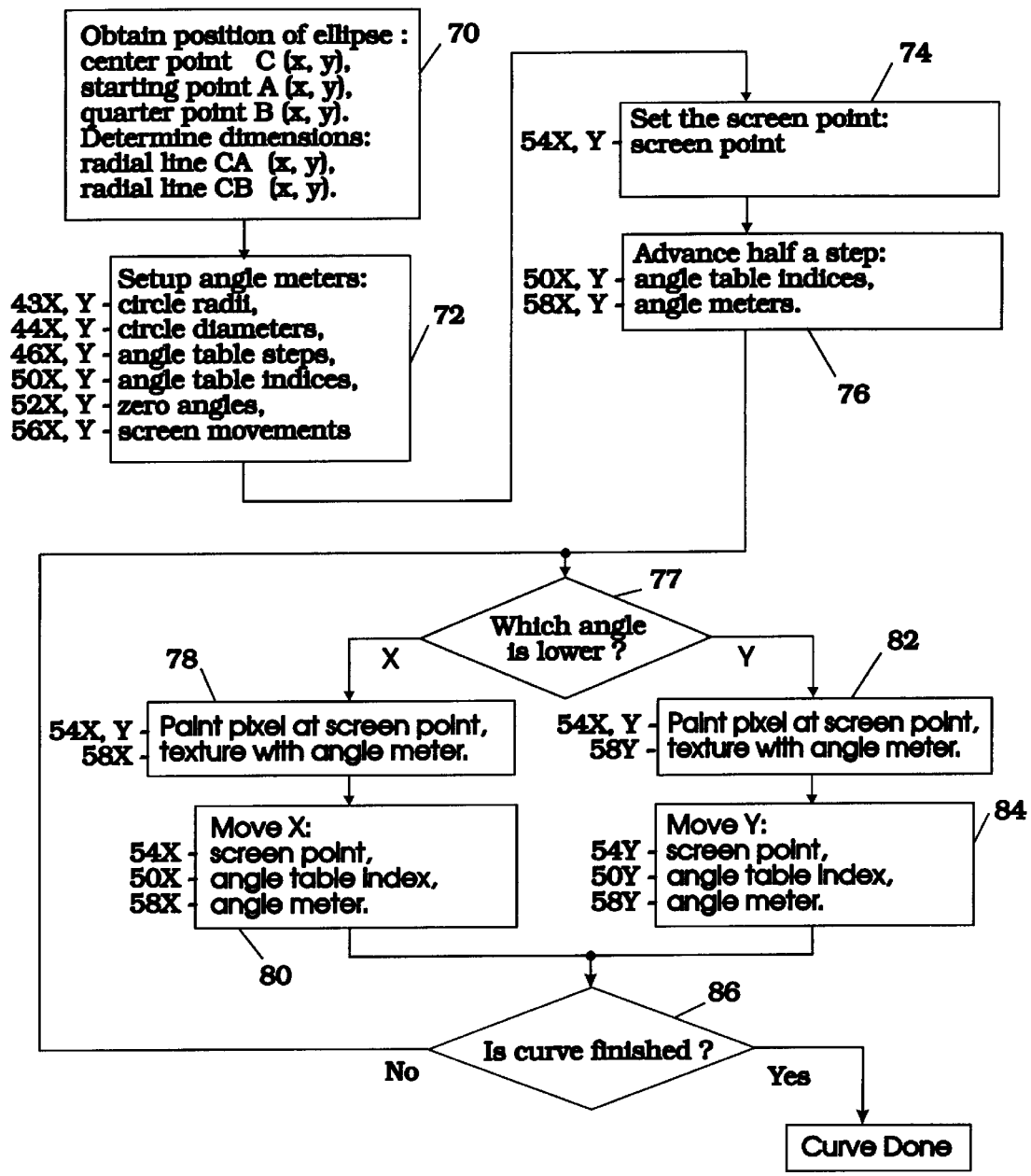
Fig. 6 Flowchart for drawing an ellipse in two dimensions.

|  | X | Y |  |
|---|---|---|---|
| Point A | 70 | 68 | 70 |
| Point B | 81 | 49 | |
| Point C | 74 | 53 | |
| Line CA | -4 | 15 | |
| Line CB | 7 | -4 | |
| Circle Radii | 8 | 16 | 72 |
| Circle Diameters | 16 | 32 | |
| Angle Table Steps | 512.0000 | 256.0000 | |
| Angle Table Indices | 2048.0000 | 3840.0000 | |
| Zero Angles (microgees) | 2730 | 658 | |
| (degrees) | 60.0000 | 14.4775 | |
| Screen Movements | 1 | -1 | |
| Screen Point | 70 | 68 | 74 |
| Angle Table Indices | 1792.0000 | 3712.0000 | 76 |
| Angle Meters (microgees) | 184 | 478 | |
| (degrees) | 4.0555 | 10.5303 | |

(Labels at left: 43X,Y; 44X,Y; 46X,Y; 50X,Y; 52X,Y; 56X,Y; 54X,Y; 50X,Y; 58X,Y)

Fig. 7A Sample initial values for drawing an ellipse in 2D

| 53 | 54X,Y | 58X | 58Y | 77 | 63 | 64 | 65 | 66 |
|---|---|---|---|---|---|---|---|---|
| Pixel Number | Screen Point | X Angle (microgees) | Y Angle | Lower Angle | Texture Angle | Texture Index | Pixel Size | Brightness Index |
| 0 | (70, 68) | 184 | 478 | X | 184 | 2 | 184 | 2 |
| 1 | (71, 68) | 536 | 478 | Y | 478 | 7 | 294 | 4 |
| 2 | (71, 67) | 536 | 817 | X | 536 | 8 | 58 | 0 |
| 3 | (72, 67) | 873 | 817 | Y | 817 | 12 | 281 | 4 |
| 4 | (72, 66) | 873 | 1098 | X | 873 | 13 | 56 | 0 |
| 5 | (73, 66) | 1202 | 1098 | Y | 1098 | 17 | 225 | 3 |
| 6 | (73, 65) | 1202 | 1345 | X | 1202 | 18 | 104 | 1 |
| 7 | (74, 65) | 1528 | 1345 | Y | 1345 | 21 | 143 | 2 |
| 8 | (74, 64) | 1528 | 1569 | X | 1528 | 23 | 183 | 2 |
| 9 | (75, 64) | 1857 | 1569 | Y | 1569 | 24 | 41 | 0 |
| 10 | (75, 63) | 1857 | 1778 | Y | 1778 | 27 | 209 | 3 |
| 11 | (75, 62) | 1857 | 1976 | X | 1857 | 29 | 79 | 1 |
| 12 | (76, 62) | 2194 | 1976 | Y | 1976 | 30 | 119 | 1 |

Fig. 7B Sample step values for drawing an ellipse in 2D

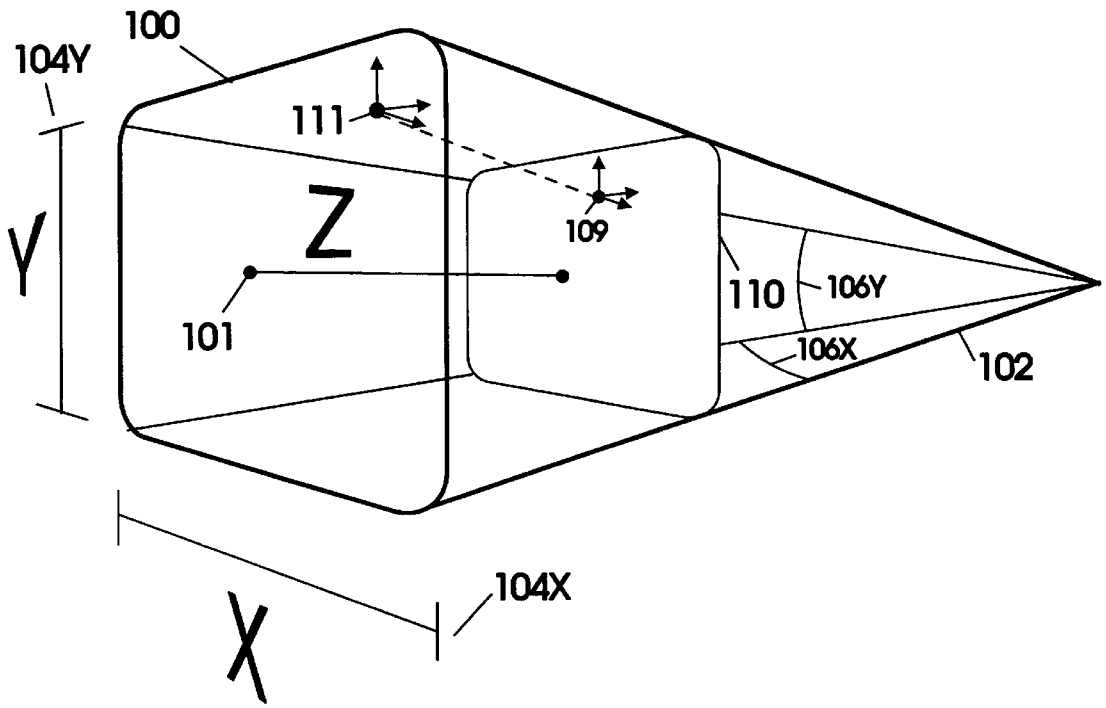
Fig. 8A  Screen Layer, Depth Constant Layer, and Perspective Field
|       |                   | X    | Y    |
|-------|-------------------|------|------|
| 104 - | Screen Resolution | (320,| 200) |
| 106 - | Field Angle       | ( 64,| 48)  |
| 108 - | View Factor       | (256,| 213) |
| | | |
|---|---|---|
| 110 - | Depth Constant | 256 |
| 112 - | Depth Exponent | 8 |
|         |               | X      | Y       |
|---------|---------------|--------|---------|
| 125X, Y - | Screen Travel | (1.0000 | 0.8320) |
Fig. 8B  Sample Values for a Perspective Field.

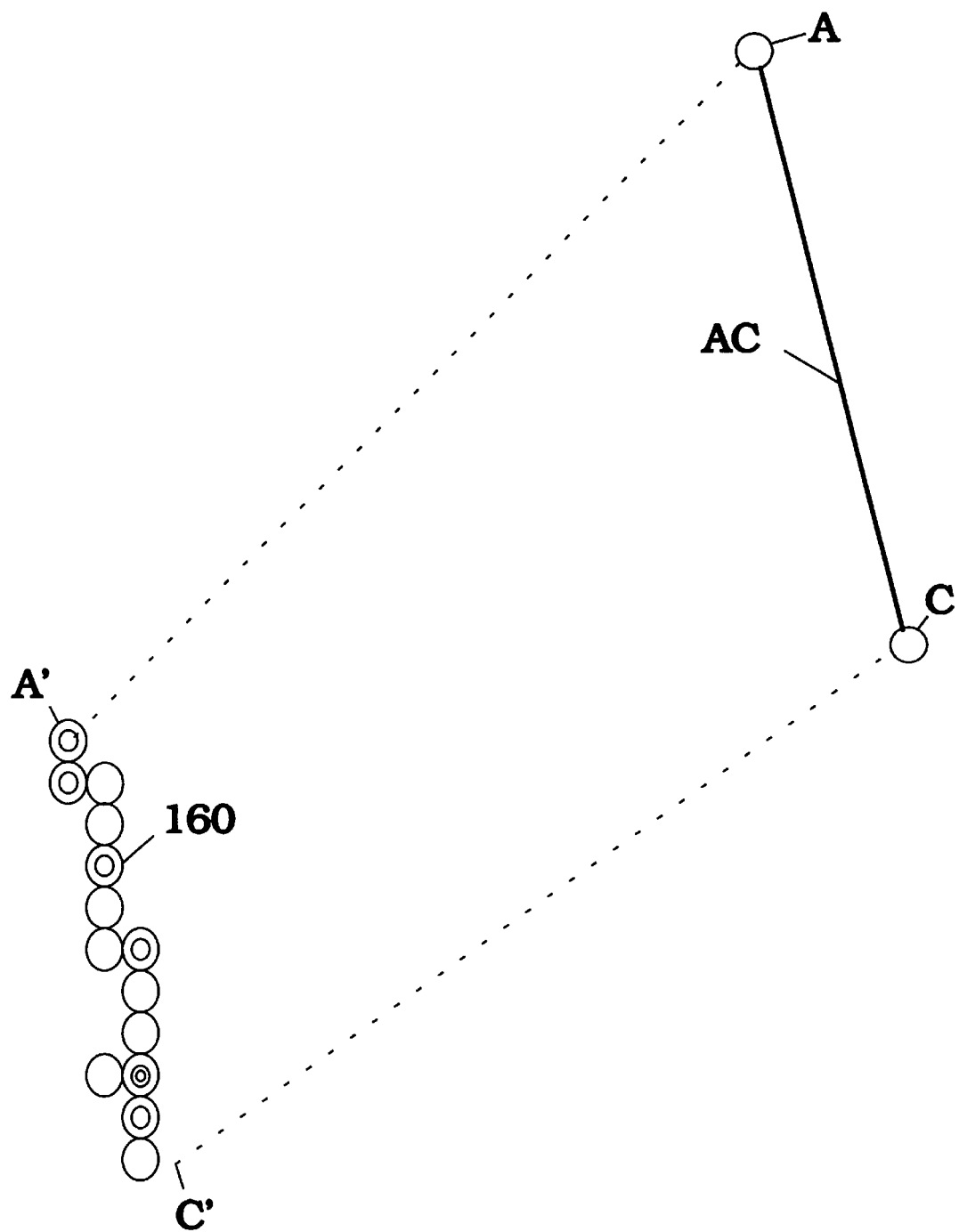
Fig. 9. Pixel map of a perspective line generation.

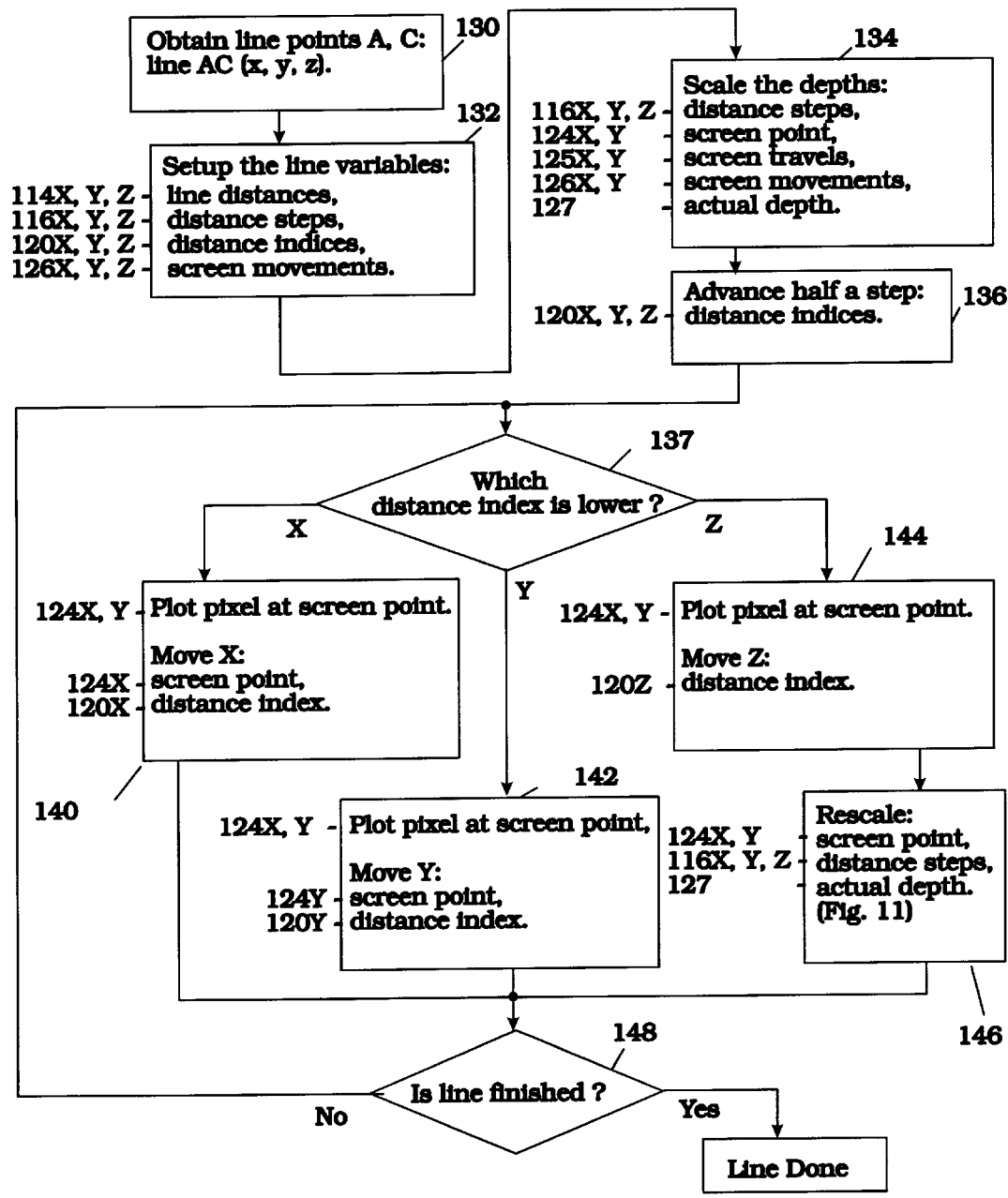
Fig. 10. Flowchart for generating a line in 3D.

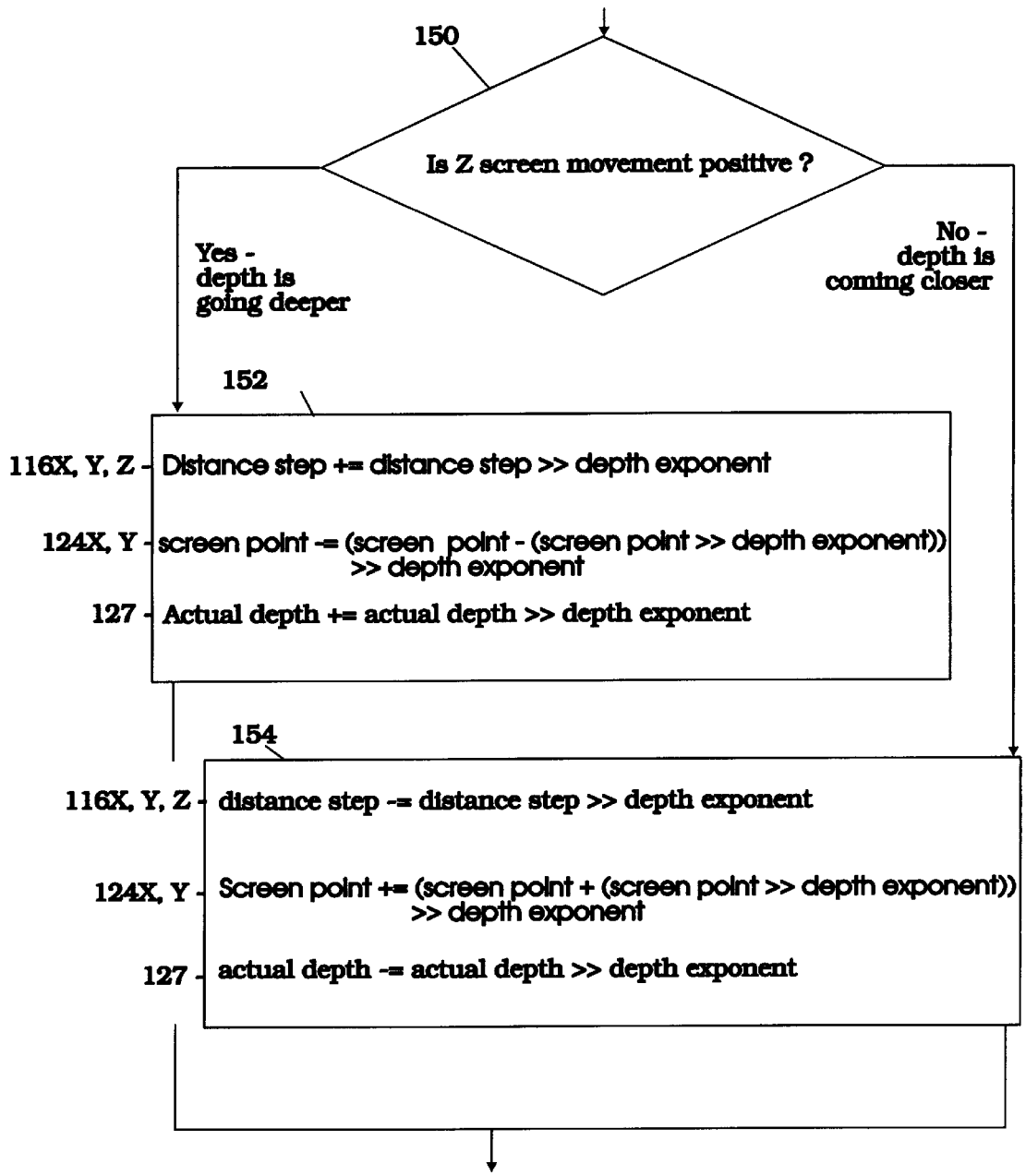
Fig. 11. Flowchart of the depth rescaling step 146.

|  | X | Y | Z |
|---|---|---|---|
| Point A | 70 | 68 | 315 |
| Point C | 74 | 53 | 321 |
| Line AC | 4 | -15 | 6 |

114X, Y, Z — Line Lengths: 4, -15, 6
116X, Y, Z — Distance Steps: 1024.0000, 273.0667, 682.6667
120X, Y, Z — Distance Indices: 0.0000, 0.0000, 0.0000
126X, Y, Z — Screen Movements: 1, -1, 1

116X, Y, Z — Distance Steps: 1260.0000, 335.9997, 839.9968
124X, Y — Screen Point: 56.8887, 45.9807
125X, Y — Screen Travels: 1.0000, 0.8320
126X, Y — Screen Movements: 1.0000, -0.8320
127 — Actual Depth: 315.0000

120X, Y, Z — Distance Indices: 630.0000, 167.9998, 419.9984

Fig. 12A Sample initial values for generating a line in 3D.

| 156 | 124X, Y | 127 | 120X | 120Y | 120Z | 137 | 116X | 116Y | 116Z |
|---|---|---|---|---|---|---|---|---|---|
| Plot | X Screen Point Y | Z Depth | X Index | Y Index | Z Index | Lower Index | X Step | Y Step | Z Step |
| 0 | (56.8887, 45.9807) | 315.0000 | 630 | 167 | 419 | Y |  | 336 |  |
| 1 | (56.8887, 45.1487) | 315.0000 | 630 | 503 | 419 | Z |  |  | 844 |
| 2 | (56.6673, 44.9730) | 316.2305 | 630 | 503 | 1263 | Y |  | 337 |  |
| 3 | (56.6673, 44.1410) | 316.2305 | 630 | 841 | 1263 | X | 1264 |  |  |
| 4 | (57.6673, 44.1410) | 316.2305 | 1894 | 841 | 1263 | Y |  | 337 |  |
| 5 | (57.6673, 43.3090) | 316.2305 | 1894 | 1178 | 1263 | Y |  | 337 |  |
| 6 | (57.6673, 42.4769) | 316.2305 | 1894 | 1515 | 1263 | Z |  |  | 846 |
| 7 | (57.4429, 42.3117) | 317.4657 | 1894 | 1515 | 2109 | Y |  | 339 |  |
| 8 | (57.4429, 41.4796) | 317.4657 | 1894 | 1854 | 2109 | Y |  | 339 |  |
| 9 | (57.4429, 40.6476) | 317.4657 | 1894 | 2193 | 2109 | X | 1270 |  |  |
| 10 | (58.4429, 40.6476) | 317.4657 | 3164 | 2193 | 2109 | Z |  |  | 850 |
| 11 | (58.2156, 40.4894) | 318.7058 | 3164 | 2193 | 2959 | Y |  | 340 |  |
| 12 | (58.2156, 39.6574) | 318.7058 | 3164 | 2533 | 2959 | Y |  | 340 |  |
| 13 | (58.2156, 38.8254) | 318.7058 | 3164 | 2873 | 2959 | Y |  | 340 |  |
| 14 | (58.2156, 37.9933) | 318.7058 | 3164 | 3213 | 2959 | Z |  |  | 853 |
| 15 | (57.9891, 37.8455) | 319.9508 | 3164 | 3213 | 3812 | X | 1280 |  |  |
| 16 | (58.9891, 37.8455) | 319.9508 | 4444 | 3213 | 3812 | Y |  | 341 |  |
| 17 | (58.9891, 37.0135) | 319.9508 | 4444 | 3554 | 3812 | Y |  | 341 |  |
| 18 | (58.9891, 36.1815) | 319.9508 | 4444 | 3895 | 3812 | Z |  |  | 857 |
| 19 | (58.7595, 36.0407) | 321.2006 | 4444 | 3895 | 4669 | Y |  | 343 |  |
| 20 | (58.7595, 35.2086) | 321.2006 | 4444 | 4238 | 4669 | Y |  |  |  |

Fig. 12B Sample step values for generating a line in 3D.

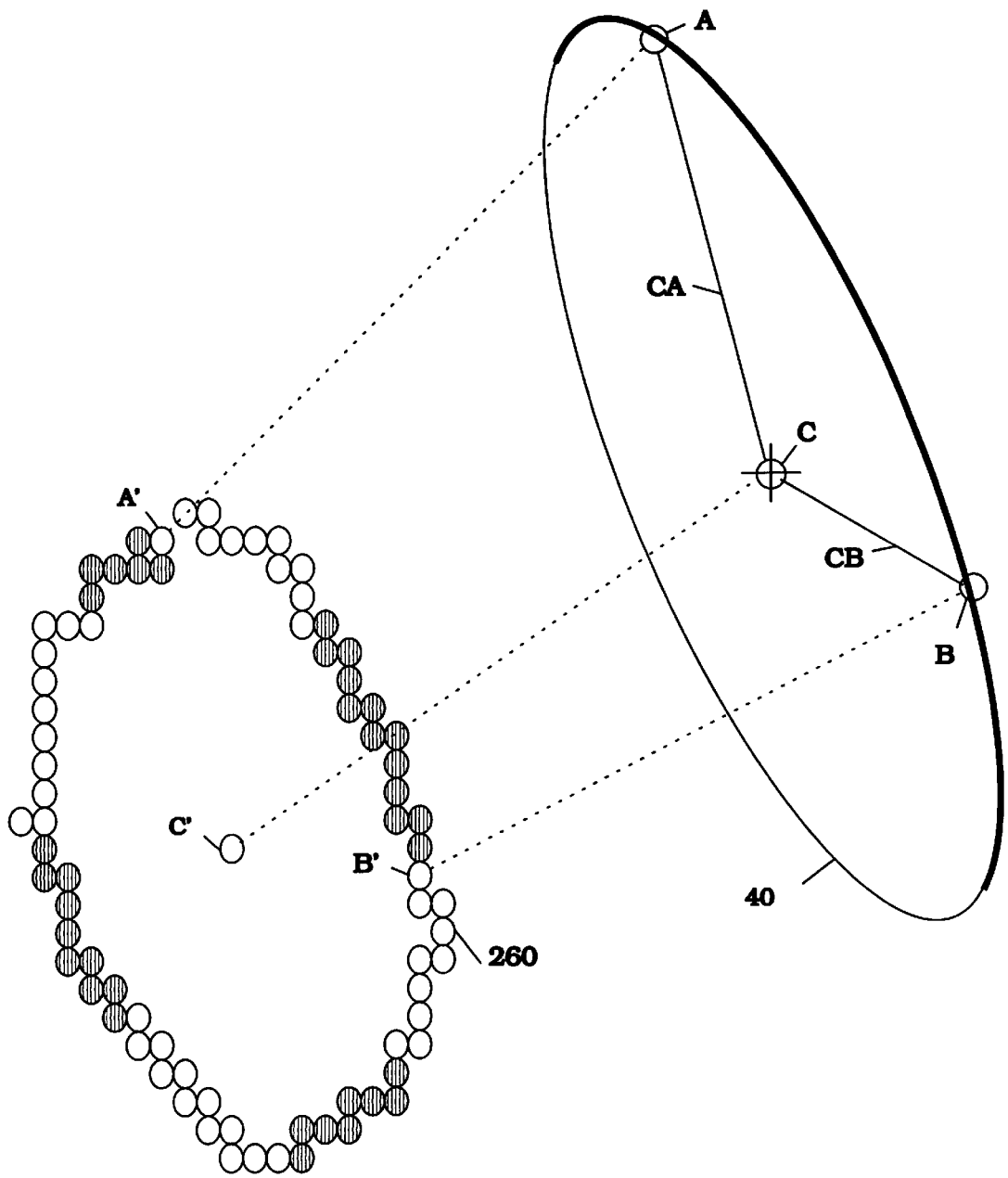
Fig. 13. Pixel map of an ellipse drawn in 3D.

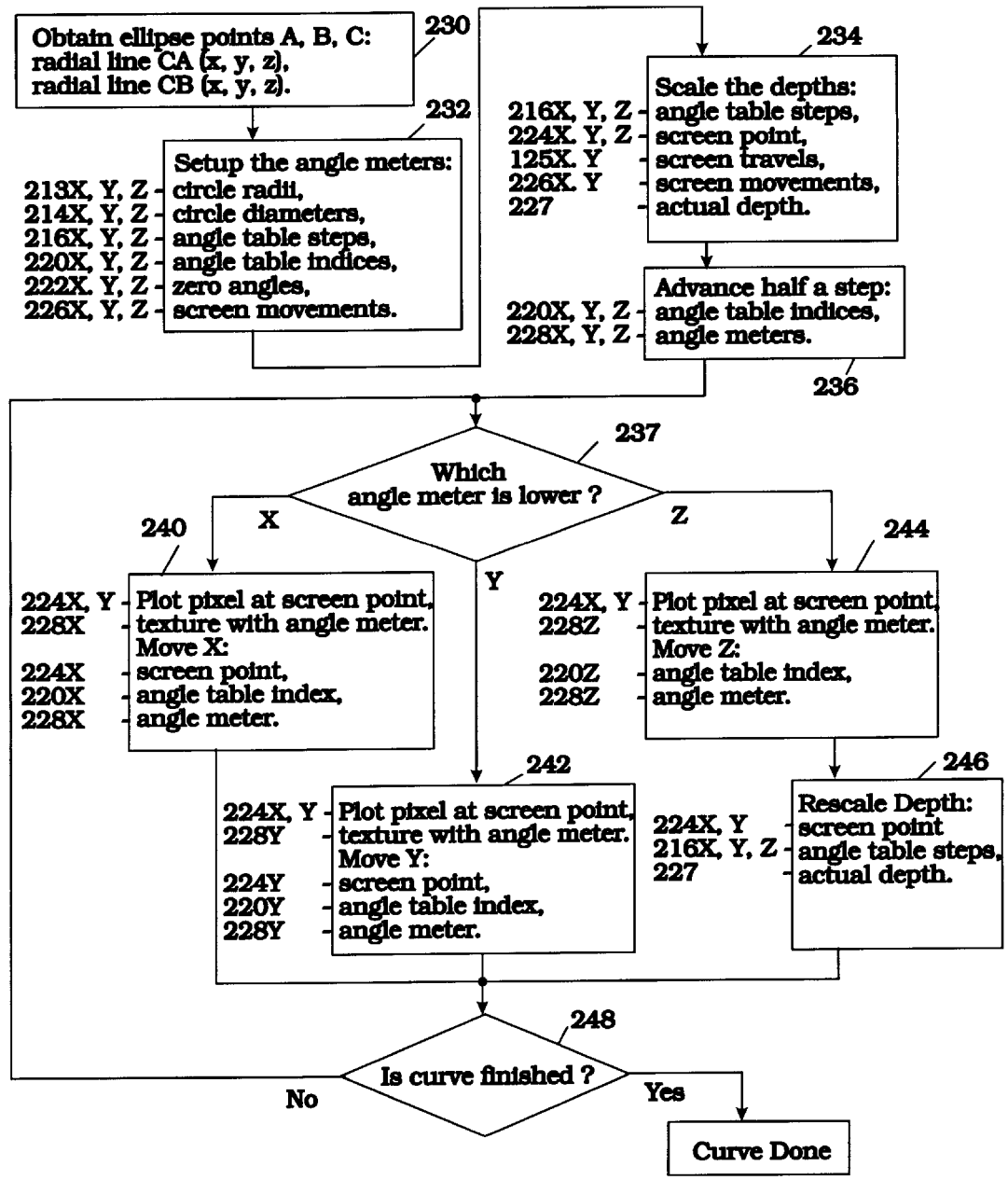
Fig. 14. Flowchart for genearting an ellipse in 3D.

|  | X | Y | Z |
|---|---|---|---|
| Point A | 70 | 68 | 315 |
| Point B | 81 | 49 | 307 |
| Point C | 74 | 53 | 321 |
| Line CA | -4 | 15 | -6 |
| Line CB | 7 | -4 | -14 |

| | | X | Y | Z |
|---|---|---|---|---|
| 213X, Y, Z | Circle Radii | 8 | 16 | 15 |
| 214X, Y, Z | Circle Diameters | 16 | 32 | 30 |
| 216X, Y, Z | Angle Table Steps | 512.0000 | 256.0000 | 273.0667 |
| 220X, Y, Z | Angle Table Indices | 2048.0000 | 3840.0000 | -1638.4000 |
| 222X, Y, Z | Zero Angles (microgees) | 2730 | 658 | 5169 |
| | (degrees) | 60.0000 | 14.4775 | 113.5782 |
| 226X, Y, Z | Screen Movements | 1 | -1 | -1 |

| | | X | Y | Z |
|---|---|---|---|---|
| 216X, Y, Z | Angle Table Steps | 630.0000 | 315.0000 | 335.9997 |
| 224X, Y, | Screen Point | 56.8889 | 45.9809 | |
| 125X, Y | Screen Travels | 1.0000 | 0.8320 | |
| 226X, Y | Screen Movements | 1.0000 | -0.8320 | |
| 227 | Actual Depth | | | 315.0000 |

| | | X | Y | Z |
|---|---|---|---|---|
| 220X, Y, Z | Angle Table Indices | 1733.0000 | 3682.5000 | -1806.3999 |
| 228X, Y, Z | Angle Meters (microgees) | 226 | 521 | 118 |
| | (degrees) | 4.9698 | 11.4478 | 2.5905 |

Fig. 15A. Sample initial values for drawing an ellipse in 3D.

| 256 | 224X, Y | 227 | 228X | 228Y | 228Z | 237 | 238 | 239 |
|---|---|---|---|---|---|---|---|---|
| Plot No. | X         Y Screen Point | Z Depth | X Angle | Y Angle | Z Angle | Lower Angle | Texture Angle | Texture Index |
| | | | ( --- microgees --- ) | | | | | |
| 0 | (56.8889, 45.9809) | 315.0000 | 226 | 521 | 118 | Z | 118 | 1 |
| 1 | (57.1120, 46.1613) | 313.7695 | 226 | 521 | 361 | X | 226 | 3 |
| 2 | (58.1120, 46.1613) | 313.7695 | 652 | 521 | 361 | Z | 361 | 5 |
| 3 | (58.3398, 46.3423) | 312.5439 | 652 | 521 | 618 | Y | 521 | 8 |
| 4 | (58.3398, 45.5102) | 312.5439 | 652 | 916 | 618 | Z | 618 | 9 |
| 5 | (58.5686, 45.6887) | 311.3230 | 652 | 916 | 895 | X | 652 | 10 |
| 6 | (59.5686, 45.6887) | 311.3230 | 1057 | 916 | 895 | Z | 895 | 13 |
| 7 | (59.8022, 45.8679) | 310.1069 | 1057 | 916 | 1202 | Y | 916 | 14 |
| 8 | (59.8022, 45.0358) | 310.1069 | 1057 | 1236 | 1202 | X | 1057 | 16 |
| 9 | (60.8022, 45.0358) | 310.1069 | 1452 | 1236 | 1202 | Z | 1202 | 18 |
| 10 | (61.0406, 45.2124) | 308.8956 | 1452 | 1236 | 1558 | Y | 1236 | 19 |
| 11 | (61.0406, 44.3804) | 308.8956 | 1452 | 1516 | 1558 | X | 1452 | 22 |
| 12 | (62.0406, 44.3804) | 308.8956 | 1848 | 1516 | 1558 | Y | 1516 | 23 |

Fig. 15B. Sample step values for drawing an ellipse in 3D.

METHOD FOR GENERATING AN ELLIPSE WITH TEXTURE AND PERSPECTIVE

FIELD OF INVENTION

The present invention relates to a method for generating a circle or ellipse on a digital computer display, and especially to a method for painting an ellipse with color texture information, and to a method for drawing an ellipse in perspective.

BACKGROUND—DESCRIPTION OF PREVIOUS STATE OF THE ART

In computer graphics, circle and ellipse generation is an operation as fundamental as line drawing and point plotting. In the prior art, several methods have been developed to generate a circle, and the more general form of an ellipse. These methods generally employ a sequence of steps that involve plotting a pixel at a known starting point, and repeatedly plotting contiguous pixels by moving in the X and Y directions.

An important goal for drawing methods is to keep execution speed as high as possible. For this reason, most circle generation methods use simple arithmetic, such as addition and comparison, in the drawing loop. Operations such as multiplication and division are avoided, since complex operations in the drawing loop affect the execution speed significantly. Another design decision is to use integer numbers in the drawing loop, because integer manipulation is simpler and faster than floating-point manipulation.

A review of the prior art begins with a circle drawing method described by J. Bresenham. The Digital Differential Analyzer (DDA), also known as Bresenham's algorithm, is described in "Dr. Dobbs Journal", July 1994, pages 119–120. The DDA employs a high-speed drawing loop in which calculations are restricted to integer addition and integer comparison. The DDA is very fast, but is limited in scope. The DDA can only generate ellipses that have their major and minor axes fixed squarely on the X and Y axes, and can only draw ellipses in two dimensions. Furthermore, the DDA is designed to paint the ellipse in one color only. No provision is made to texture the ellipse.

A system for generating a circular or elliptic arc is given in U.S. Pat. No. 5,146,551 to Atsushi Miyazawa (Sep. 8, 1992). This system employs a modified DDA specifically designed to calculate the scan-line intersection points for an ellipse. The basic improvement over the DDA is the ability to forecast the length of straight line segments that compose the ellipse.

A method for generating an ellipse is provided by U.S. Pat. No. 4,941,116 to William R. Hancock et al (Jul. 10, 1990). This method provides a major improvement in ellipse drawing in that an ellipse can be drawn with any orientation in space. However this method does not provide the ability to draw an ellipse in perspective. This method also suffers from the requirement of multiplication's in the drawing loop. The drawing method uses a sin and cos look-up table. The X and Y coordinates are generated by combining an X and a Y circle, each circle having a different radius and starting angle. The two circles are rotated together with a common angular increment. The X and Y coordinates are simply found by using the rotation angle of each circle as an index into the cos or sin table, and extending the resultant position by radius of each circle. In analyzing the drawing loop, note that the two multiplications required to find each point add significant complexity to the ellipse generation. In addition, the angular increment that directs the rotation of the two circle has to be chosen carefully. If the circles are rotated too far between successive points, the ellipse may show a gap. Therefor, the angular increment is chosen to be small to provide a continues curve. This decision may result in some points being over-written multiple times, as the rotation increment does not always carry the circles to a new point. This drawing method is implemented as a dedicated digital circuit, with hardware multipliers. The required multiplications in the drawing loop will cause a significant execution slowdown on a computer CPU. Note that this drawing method can provide texture information to the ellipse on the screen, by using the rotation angle to lookup a color. This effectively maps color onto the ellipse as a function of rotation angle.

The prior art methods described thus far are designed to generate an ellipse in two dimensions. Although drawing an ellipse with true perspective is a desirable goal in computer graphics, the present state of the art does not provide an efficient method for doing so. One conceivable method of drawing an ellipse with perspective is to use the perspective formula to translate an ellipse generated in world space to a curve on the display screen. The perspective formula is given as:

screen.x=space.x/space.z screen.y=space.y/space.z

The points of an ellipse are found in world space: X, Y and Z dimensions. Each space point is then translated using the perspective formula to a screen point. This method does generate a perspective ellipse, but suffers from the requirement of two divisions per pixel. To this date, a method to avoid these divisions has not yet been discovered.

An additional problem that arises in translating world space points to perspective screen points is the possibility of gaps between successive screen points. Consider, for instance, what happens when the Z coordinate of a curve grows smaller.

This occurs in the section of the ellipse that is closest to the viewer. Here, the apparent size of the curve expands. As a result, the perspective formula may produce a curve with gaps between the neighboring screen points. These gaps can be avoided by refining the ellipse drawn in world space. But then screen points may well be over-written numerous times before moving on to a new screen point. This method, which cannot avoid superfluous calculations, can only be characterized as inefficient (especially when considering that the calculations are division operations).

For this reason, the prior art simulates perspective curves by a series of short chained straight vectors that gradually change orientation to approximate curvature. The straight-line method calculates the intermediary points along the curve, computes the perspective locations of these points, and generates the straight line segments to complete the curve. However, when the number of segments is not large enough, the distortion in the curve becomes noticeable. Therefore many short line vectors must be used if a really smooth curve is desired. This increases the time cost of drawing the curve. In addition, providing color texture along each straight-line segment requires the application of a parabolic approximation to simulate the depth change of perspective. Computing the parabolic formula burdens this method even more. As a result, textured ellipses drawn in perspective have been relatively complex to implement in computer graphics.

A high-speed method for drawing elliptical curves, in both two and three dimensions with perspective, with color texture and (optional) anti-aliasing, is a desirable tool to complement the existing state-of-art in computer graphics. Such a method, if simple enough, can be performed by a dedicated digital circuit to provide the highest possible drawing speed. Such a method can be used to construct a wide variety of curved lines by fitting together different sections of elliptical arcs. And, such a method may provide the ability to construct solid-looking rounded shapes, such as spheres, by combining several elliptical curves lying next to each other.

OBJECTS AND ADVANTAGES

Accordingly, several objects and advantages of the present invention are:

1) To provide a method for generating an ellipse in two dimensions, textured accurately, with optional anti-aliasing, with a drawing loop using only simple arithmetic operations. The resulting elliptical curve is smooth and continues. The prior art requires multiplication in the drawing loop to provide texture generation.
2) To provide a method for drawing an elliptical curve in three dimensional perspective, textured accurately, with optional anti-aliasing, with a drawing loop using only simple arithmetic operations. The resulting elliptical curve is smooth and continuous. The prior art relies on subdividing the curve into straight-line segments, which introduces distortion into the curve, and requires relatively complex computations to provide texture with perspective foreshortening.

Still further objects and advantages will become apparent from a consideration of the ensuing description and accompanying drawings.

BRIEF DESCRIPTION OF THE DRAWINGS

FIG. 1 shows a computer system for drawing an ellipse on a digital graphics display.

FIGS. 2A–2B show a texture table used to paint an ellipse.

FIG. 3 shows a pixel generator drawing an ellipse in two dimensions.

FIG. 4 is a view in detail of an rotational angle meter.

FIG. 5 is a pixel map of an ellipse drawn in two dimensions.

FIG. 6 is a flowchart for generating an ellipse in two dimensions.

FIGS. 7A–7B are a sample of values used in drawing an ellipse in two dimensions.

FIGS. 8A–8B show a perspective field of view with a depth constant.

FIG. 9 is a pixel map of a line drawn in three dimensions with perspective.

FIG. 10 is a flowchart for generating a line in three dimensions with perspective FIG. 11 is a flowchart detailing the depth rescaling step using the depth constant.

FIGS. 12A–12B are a sample of values used in drawing a line in perspective.

FIG. 13 is a pixel map of an ellipse drawn in three dimensions with perspective.

FIG. 14 is a flowchart for generating an ellipse in three dimensions with perspective.

FIGS. 15A–15B are a sample of values used in drawing an ellipse in perspective.

SUMMARY

A method of generating a textured ellipse on a digital computer system, comprising the steps of obtaining the X, Y and Z dimensions of the ellipse, setting up X, Y and Z angle of revolution meters using an arccos lookup table, entering a drawing loop at known starting point, and repeatedly making X, Y and Z step decisions to advance along the elliptical curve by comparing the X, Y and Z rotation angles, and painting color texture information on the elliptical curve using the rotation angles as a texture index, additionally and optionally antialiasing the color texture by measuring the angle step from pixel to pixel, and translating the X and Y step motion along the elliptical curve directly to a screen point on a graphics display; and a method to transform the X, Y and Z step movement along the elliptical curve to a perspective path by using a depth constant, defined by a perspective field of view, and effectively rescaling the ellipse during each Z step, with the emphasis of making all X, Y and Z steps in the drawing loop with simple arithmetic operations consisting exclusively of integer addition, subtraction, binary right-shifting and comparison.

Preferred Embodiment—Description of Figures

The method for generating a textured ellipse is described in two sections. Section I describes the generation of an ellipse using two dimensions. That is, although the ellipse is oriented in three dimensional space, the ellipse is drawn using only the X and Y dimensions. Section II describes the generation of an ellipse in three dimensions with perspective. Section I needs to be understood before reading section II. FIGS. 2–7 illustrate section I, and FIGS. 8–15 illustrate section II.

Parts numbered with an X suffix operate in the X dimension. These parts can have counter-parts in the Y and Z dimensions. Those that do use the same number to denote their common nature, but have an X, Y or Z suffix to identify themselves separately. For example, three parts with similar functions in the X, Y and Z dimensions may be numbered 50X, 50Y, and 50Z. These parts may be illustrated in a figure as 50X, Y, Z to reduce typing clutter.

FIG. 1 shows a computer system, comprising a CPU 28 that loads rendering software from a permanent storage device 26 into a temporary memory space 30. Directed by a keyboard 20, the CPU subsequently steps through the program and generates an ellipse by writing color and position information to a digital graphics display 22, or a matrix printer 24, where the generated ellipse is shown.

FIG. 2 shows a texture table 32 designed to map color information around 360 degrees of an ellipse. The texture is demonstrated on a circle 34. The example texture consists of white and black colors alternating every 45 degrees. The texture table 32 consists of 256 elements. These elements are addressed by texture indices 36. When antialiasing of the curve is desired, the texture table 32 has additional brightness levels 37, ranging from dim (level 0) to bright (level 4).

The resolution of texture table 32 is 360 degrees/256 elements=1.4063 degrees per element. A higher texture resolution can be achieved by increasing the texture table size by powers of two. For example, a texture table with 4,096 color elements has a texture resolution of 0.0879 degrees per element.

FIG. 3 shows a pixel generator 60 drawing an ellipse 40 in two dimensions. Ellipse 40 is defined by a center point C and by two points located on the ellipse, A and B. Two radial lines CA and CB span 90 degrees in the rotation plane of the ellipse 40. The ellipse 40 fits in a rectangle 42 with dimensions 44X and 44Y. The dimension 44X describes the diameter of a circle 43X, and the dimension 44Y describes the diameter of a circle 43Y. An angle meter 58X produces angle readings for each point along the circle diameter 44X, and another angle meter 58Y produces angle readings for each point along the circle diameter 44Y. The pixel generator 60 starts from point A and chooses a path along the elliptical curve by making either X steps or Y steps. A comparator 77 determines which of the X and Y angle meters 58X or 58Y is lower. If the angle meter 58X is lower, the pixel generator makes a screen movement 56X, and otherwise makes a screen movement 56Y. As each pixel is plotted, a color 62 is selected from the texture table 32 using the appropriate angle meter 58X or 58Y as the texture index. A point 67 marks the place where the screen movement 56X reverses direction. A point 68 marks the place where the screen movement 56Y reverses direction.

FIG. 4 is a detailed view the angle meter 58X. An angle table 38 provides rotation angles for a circle with a large, fixed diameter of 8192. The angle table 38 therefore has a data lookup table consisting of 8192 elements. The angle table 38 elements are addressed from −4096 to 4095. The angle table 38 contains angle data 39 generated by an arccos trigonometric function. The arccos function provides the rotation angle of a circle, given a point on the circle. The angle table 38 covers a rotation angle range from 0 to 180 degrees. These angles are stored in the data table as microdegrees, or "microgees", where 16,384 microgees equals 360 degrees.

The angle meter 58X consists of an angle table step 46X, an angle table index 50X, a zero angle register 52X, and a subtractor 53X. In setting up the angle meter 58X, the angle table step 46X is calculated as the angle table 38 size divided by the circle diameter 44X. The angle table index 50X is initially placed at the start location derived from starting location CA.x. The zero angle register 52X stores the angle reading given by this starting location. The subtractor 53X subtracts the zero angle 52X from the angle table 38 readings, producing the readings of angle meter 58X. Before entering the drawing loop, the angle table index 50X advances half an angle table step 46X to 47X. This makes the angle meter 58X read the angles occurring between the points along circle diameter 44X.

The angle meter 58X is now set and ready to use by the pixel generator 60. Whenever the pixel generator 60 makes an X step, the angle table index 50X decrements by one angle table step 46X. When the angle table index 50X reaches index location 48X, the angle table index 50X resets to index location 49X, and the zero angle 52X is decremented by 8,192 microgees, or 180 degrees.

FIG. 5 is a pixel map of the ellipse 40 drawn in two dimensions. The ellipse 40 is textured with texture table 32, and antialiased with brightness indices 37. The pixels variably shaded black pixels illustrate the antialiased brightness occurring along the curve.

FIG. 6 is a flowchart for drawing an ellipse in two dimensions. Step 70 obtains the position of the ellipse, which is described by the centerpoint C, starting point A, and quarter point B. Step 72 finds the X and Y circle radii 43X and 43Y, and the circle diameters 44X and 44Y, and sets up the angle table steps 46X and 46Y, angle table indices 50X and 50Y, zero angles 52X and 52Y, and initializes the X and Y screen movements 56X and 56Y to move in the correct direction towards point B.

Step 74 places the screen points 54X and 54Y to the starting point A. Step 76 decrements the angle table indices 50X and 50Y by half an angle table step 46X and 46Y. This positions the angle meters 58X and 58Y to read the angles between the points along the circle diameters 44X and 44Y. The flowchart now enters the drawing loop.

Comparator 77 checks the angle meters 58X and 58Y, and branches to step 78 if the angle meter 58X is lower, and to step 82 if the angle meter 58Y is lower. Step 78 paints the pixel at the screen point 54X and 58Y with a color 62 from texture table 32, selected by the angle meter 58X. Step 80 increments the screen point 54X by one screen movement 56X, and decrements the angle table index 50X by the angle table step 46X. Steps 82 and 84 perform equivalent actions for the Y step. Comparator 86 checks for completion of the curve, and branches back to comparator 77 to complete the curve.

FIG. 7 lists the values used in drawing the ellipse 40 in two dimensions. The table lists floating-point numbers for the ease of description. In the preferred embodiment, these floating-point numbers are stored as 32 bit fixed-point numbers. The first table follows the FIG. 6 flowchart steps 70–76. The second table lists the generation of the first 16 pixels along the elliptical curve 40. The screen point 54X and 54Y lists the location of the pixels on the screen. The angle meters 58X and 58Y list the rotation angles as the pixels are drawn. Comparator 77 lists the X or Y steps taken. The texture angle 63 is the lower of the angle meters. The texture index 64 is computed from the texture angle, by dividing the texture angle by 64. In the drawing loop, this division is accomplished by a binary shift to the right by 6 places. The texture index 63 selects the color 62 from the texture table 32. The pixel size 65 is the difference between successive texture angles. The brightness index 66 is computed from the pixel size, by dividing the pixel size by 64. The brightness index 66 selects the color brightness 37 from the texture table 32.

FIG. 8 shows a graphics display 100 describing a perspective field of view 102. The view plane normal is coincident with the Z axis. A screen center 101 acts as the origin for the perspective view. The graphics display 100 is a pixel matrix with an X resolution 104X and a Y resolution 104Y. A perspective field 102 is defined by an X field angle 106X and a Y field angle 106Y. Two view factors 108X and 108Y are calculated as a function of the screen resolution 104X and 104Y, and the field angle 106X and 106Y:

X view factor=(X screen resolution/2)/tan(X field angle/2)

Y view factor=(Y screen resolution/2)/tan(Y field angle/2)

The view factors define the world space to perspective screen transformation:

X screen=X space * X view factor/Z space  [1]

Y screen=Y space * Y view factor/Z space.

The perspective formula [1] uses the view factors 108X and 108Y to map space points squarely into the perspective field 102. Note that, for the example values shown in FIG. 8, the view factor 108X does not equal the view factor 108Y. This is because the display pixels are non-square. Specifically, the angle width of the screen pixels is (64 degrees/320 pixels)=0.20 degree/pixel, and the angle height is (48 degrees/200 pixel)=0.24 degree/pixel. The pixels of the display screen 100 therefore have a X to Y size ratio of (0.20/0.24)=83%. The view factor has an X to Y ratio of (256/213)=120%. These two ratios multiplied together result in a ratio of 1. FIG. 9 and FIG. 13 show pixels slightly elongated to accurately illustrate the non-square pixels of display screen 100.

A depth constant 110 is chosen as a binary number equal to or greater than the X and Y view factors 108X and 108Y.

The depth constant 110 can thus be defined as an exponent, called the depth exponent 112. While the curve is being drawn, the Z coordinate of all space points is effectively held at the depth constant 110. Thus the term "depth constant" describes an essential aspect of the space to screen transformation. The numeric values shown in FIG. 8 are given for as an example. The operation of the depth constant is adaptable to any kind of screen.

The principle operation of the depth constant can be described generally by considering a space point 112, and the corresponding perspective screen point 111. The space point 109 is restricted to move in one direction at a time. These movements are called steps, and can occur in six directions; +X, +Y, +Z, and −X, −Y, −Z. The positive steps are shown with arrows. Each of these steps translates to a movement of the screen point 111. The X step translates through the perspective formula [1] to a movement of the screen point 111 in the X dimension only. Similarly, the Y step moves the screen point 111 in the Y dimensions only. The Z step is more complicated. The Z step moves the screen point 111 in both the X and Y dimensions, and additionally requires a rescaling operation of the curve dimensions. However, because the Z step takes place where Z equals the depth constant, and because the depth constant is a binary number, the rescaling operation can be carried out using binary shift operations. The exact workings of the X, Y and Z steps are described in more detail in the section describing the operation of the depth constant.

FIG. 9 shows a line 160 drawn with perspective on the display screen 100. The drawing of line 160 is included mainly as an example to show the depth constant 110 in operation. The line 160 is drawn from point A to point B. Some pixel rewrites occur during the drawing of the line 160, and these rewrites are illustrated with double and triple circles.

FIG. 10 is a flowchart describing the steps for generating a line in three dimensions using the depth constant 110. The line 160 is setup and drawn in much the same way as the ellipse 260. Both are initially scaled to use the depth constant 110, begin at a known starting point A, and work their way to a known ending point. In the drawing loop, X, Y and Z steps are chosen by progress indicators. For the line 160, the progress indicators are simply distance indicators for each X, Y and Z dimension. For the ellipse 260, the progress indicators are angle meters. The drawing of the line 160 is easier to understand, because angle meters aren't used in the course of drawing.

Step 130 obtains the beginning point A and ending point C.

Step 132 computes the X. Y and Z space distances 114X, 114Y and 114Z of the line 160. These produce corresponding distance steps 116X, 116Y and 116Z. For example, the distance step 116X is equal to 4096/distance step 114X. A set of distance indices 120X, 120Y and 120Z keep track of the distance moved along the X, Y and Z dimensions. A listing of sample numeric values of the distance indices is given in FIG. 12.

Step 134 performs an initial rescaling of the distance steps 116X, 116Y and 116Z to setup for use with the depth constant 110. This rescaling operation will be described later in detail. Two screen points 124X and 124Y is initially set at the perspective point A'. Two constants 125X and 125Y describe the movement of the screen points 124X and 124Y when the line takes and X step or a Y step. These constants are determined before entering the drawing loop. The plus or minus direction of the screen movements are stored in variables 126X, 126Y and 126Z. These show which way the line is moving in each dimension, either positive or negative. A variable called the Z actual depth 127 is set to the starting point depth A.z, and keeps track of the actual depth of the line during the drawing.

Step 136 advances the distance indices 120X, 120Y and 120Z by a half-step to initialize them. A half-step means that index 120X advances by one-half of 116X, index 120Y advances by one-half of 116Y, and 120Z advances by one-half of 116Z. The line is now setup and ready to enter the drawing loop.

The drawing loop begins with a comparator 137 to determine which of the X, Y and Z distance indices 120X, 120Y, and 120Z is lower. The comparator 137 branches to one of three steps.

Step 140 plots a pixel at the screen point 124. The pixel is painted with a color selected from a texture table by the distance index 120X. Next, the line steps in the X direction. This means the screen point 124X is incremented by the screen travel 125X. Finally, the distance index 120X increments by the distance step 116X.

Step 142 plots a pixel and moves a step in the Y direction. This step is similar to step 140, except the only the Y dimension is used.

Step 144 plots a pixel at the screen point 124. The pixel is painted with a color selected from a texture table by the distance index 120Z. The distance index 120Z is incremented by the distance step 116Z. A rescaling step 146 follows, involving the screen points 124X and 124Y, the distance steps 116X, 116Y and 116Z, and the Z actual depth 127. This step is illustrated in detail in FIG. 11.

Finally, a comparator 148 determines whether the line is done by checking whether the distance indices 120X, 120Y and 120Z have arrived at their end values. If not, the comparator branches to comparator 137 to finish the line.

FIG. 11 is a flowchart that show the rescaling step 146 in detail. Step 146 begins with a comparator 150 to determine whether the Z step is positive or negative, depending on the screen movement 126Z. If positive, the comparator branches to step 152, and otherwise branches to step 154.

Step 152 affects three things. The screen points 124X and 124Y are rescaled by a ratio of (depth constant)/(depth constant+1). The distance steps 116X, 116Y and 116Z are rescaled by a ratio of (depth constant+1)/(depth constant). The actual depth 127 is rescaled by a ratio of (depth constant+1)/(depth constant). These rescaling ratios are rewritten with the binary right shift operator>>. The numbers are shifted to the right by the depth exponent 112. This is equivalent to division by the depth constant 110. The binary shift operation, however, can be executed much faster than a division operation. Therefor, although the rescaling step 152 appears complex, it can actually be implemented relatively easily. The rescaling ratios are explained in more detail in the section describing the operation of the depth constant.

Step 154 is similar to step 152, but uses a minus one instead of a plus one in the rescaling ratios.

FIG. 12 lists the values used in drawing the perspective line 160. The table lists floating-point numbers for the ease of description. in the preferred embodiment, these floating-point numbers are stored as 32 bit fixed-point numbers. The first section of the table follows the FIG. 10 flowchart steps 130–136. The second section of the table lists the plot numbers of the entire line, from point A' to point C'. The screen points 124X and 124Y list the location of the pixels on the graphics display 100. The pixel location is taken as the integer portion of the screen pair 124. The Z actual depth 127 is the current depth of the line, and changes with every Z step. The distance indices 120X, 120Y and 120Z list their progress as the pixels are plotted. Comparator 137 lists the order of X, Y or Z steps taken. The distance steps 116X, 116Y and 116Z list their values. Note how each Z step rescales the distance steps as the line depth changes.

FIG. 13 shows the ellipse 40 drawn in three dimensions with perspective, using the depth constant 110 and the display screen 100. The resulting ellipse 260 is shown by a pixel map. The pixel shadings illustrate the texture selection along the ellipse using texture table 32. The texture antialiasing, as shown in FIG. 5, is not shown in FIG. 11 in the interest of simplicity. The points A, B and C are the same points used in FIG. 5. These translate through the perspective formula [1] to points A', B', and C'.

FIG. 14 is a flowchart describing the steps for generating an ellipse in three dimensions. Step 230 measures an ellipse with centerpoint C, starting point A, and quarter point B. These form two radial lines CA and CB in X, Y, Z space.

Step 232 computes the circle radii 213X, 213Y and 213Z using the distance formula. Doubling these radii gives the circle diameters 214X, 214Y and 214Z. The angle table steps 216X, 216Y and 216Z are found by dividing the circle diameters into the angle table size 38. The initial locations of the angle table indices 220X, 220Y and 220Z are found at starting point CA. The zero angles 222X, 222Y and 222Z store the starting point CA rotation angles.

Step 234 rescales the angle table steps 216X, 216Y and 216Z by the ratio (A.z/depth constant). Two screen point 224X and 224Y are set at starting point A'. The screen travels 125X and 125Y are derived as described in FIG. 8. The screen movements 226X, 226Y and 226Z are set to move in the initial direction in each dimension. These direct the movement of the X, Y and Z steps as the pixels are plotted. The Z actual depth 227 is set to the starting point depth A.z.

Step 236 advances the angle meters 228X, 228Y and 228Z by half a point to read the angles occurring between the curve points. The flowchart now enters the drawing loop.

A comparator 237 determines which of the X, Y and Z angle meters 228X, 228Y and 228Z is lower, branching to step 240 for an X step, step 242 for a Y step, and step 244 for a Z step.

Step 240 plots a pixel at the screen points 224X and 224Y, and paints the pixel with a color taken from the texture table 38. The angle meter 228X is divided by 64 to act as the texture selection index. Then the screen point 224X is incremented by the screen movement 226X, the angle table index 220X is incremented by the angle table step 216X, and the angle meter 228X finds the new angle reading.

Step 242 performs essentially the same operations for the Y step as step 240 performs for the X step.

Step 244 plots a pixel using the angle meter 228Z, and advances the angle meter 228Z. Then step 246 rescales the screen points 224X and 224Y, the angle table steps 216X, 216Y and 216Z, and moves the Z actual depth 227 to the next depth along the curve. Step 246 is essentially outlined in FIG. 11, except for using the angle table steps 216X, 216Y and 216Z in place of the distance steps 116X, 116Y and 116Z.

A comparator 248 determines whether the curve is done, and branches back to comparator 237 to finish drawing the curve.

FIG. 15 lists the values used in drawing the perspective ellipse 260. The table lists floating-point numbers for the ease of description. In the preferred embodiment, these floating-point numbers are stored as 32 bit fixed-point numbers. The first table follows the FIG. 14 flowchart steps 230–236. The second table lists the plot numbers for the first 16 plots, starting from point A'. The screen points 224X and 224Y list the location of the pixels on the graphics display 100. The pixel location is given by the integer portion of the screen points. The Z actual depth 227 lists the current depth of the curve. The angle meters 228X, 228Y and 228Z list the angles as the pixels are plotted. Comparator 237 lists the order of the X, Y and Z steps taken. The texture angle 238 is the lower of the angle meters. The texture index 239 is computed as the texture angle divided by 64. The texture index 239 selects the paint color for each plot from texture table 32.

Preferred Embodiment—Description of Operation
Section I: Two Dimensional Ellipse Generation An ellipse is a circle in world space. When the ellipse is aligned with the X and Y axes, the ellipse appears as a perfectly round circle. Otherwise, the ellipse appears as a squeezed circle, reducing to a single line when the ellipse is viewed edge on. An ellipse is measured by three circle diameters in the X, Y and Z dimensions. But an ellipse can be drawn using only the X and Y dimensions. Two rotation angle meters operating in the X and Y dimensions cooperate to decide which X and Y steps to take as the elliptical curve is being drawn.

Setup of the Two Dimensional Ellipse Generation

The ellipse 40 in FIG. 3 has a centerpoint C and two points A and B that span 90 degrees (a quarter circle) in the plane of the ellipse. The sample numeric values for A, B and C are listed in FIG. 7. The ellipse 40 is measured with two radial lines CA and CB:

$$CA=(A.x-C.x, A.y-C.y)$$

$$CB=(B.x-C.x, B.y-C.y)$$

Ellipse 40 is contained within the rectangle 42, which defines the circles 43X and 43Y. The radii of these circles is found by applying the distance formula to the X and Y portions of lines CA and CB:

$$X \text{ circle radius}=(CA.x^2+CB.x^2)^{1/2}$$

$$Y \text{ circle radius}=(CA.y^2+CB.y^2)^{1/2}$$

FIG. 4 shows the rotation angle meter 58X in detail, and is a template for other angle meters. The angle meter 58X is based on the circle 43X, whose diameter describes the ellipse X dimension. The angle meter 58X is designed to provide the rotation angle as the screen point 54X moves back and forth on circle diameter 44X.

The angle meter 58X finds the angle table step 46X as (size of angle table 38/circle diameter 44X). The angle table index 50X and the screen movement 56X are setup by considering CA.x and CB.x. If CB.x is negative, the screen movement 56X is set to −1, and the table index 50X is set to (table step 46X * CA.x). Otherwise, if CB.x is positive, the screen movement 56X is set to +1, and the table index 50X is set to (table step 46X * (−CA.x)).

Now the zero angle 52X can be found as (arccos[table index]). If the zero angle turns out to be less than 2,048 microgees (or 45 degrees), the zero angle is recalculated using CB.x. The purpose of the recalculation is to find a more exact starting angle. The idea is that CB.x will be on a shallow slope when CA.x is on a steep slope of the arccos table. Specifically, if the screen movement is −1, the zero angle is recalculated as (4,096 microgees −arccos[table step * (−CB.x)]). Otherwise, if the screen movement is +1, the zero angle is recalculated as (4,096 microgees−arccos[table step * CB.x]). Similarly, if the zero angle turns out to be more than 6,144 microgees (or 135 degrees), the zero angle is also recalculated using CB.x. Specifically, if the screen movement is −1, the zero angle is recalculated as (4,096 microgees+arccos[table step * (−CB.x)]). Otherwise, if the screen movement is +1, the zero angle is recalculated as (4,096 microgees+arccos[table step * CB.x]).

A subtractor 53X subtracts the zero angle 52X from subsequent angle table readings during the drawing of the ellipse. The output of subtractor 53X produces the reading of angle meter 58X.

The angle table index 50X initially decrements by half of the angle table step 46X so that the angle meter 58X reads the rotation angles occurring between the stepping points on circle diameter 44X.

If the circle diameter is 0, the angle meter can simply lodge an angle meter reading of more than 360 degrees, or 16,384 microgees. This insures that the pixel generator 60 never chooses to make a step with this angle meter during the ellipse generation.

The flowchart shown in FIG. 6 outlines the whole drawing procedure. Step 72 sets up the two angle meters 58X and 58Y. Step 74 sets up the screen point 54X and 54Y to the starting point A. Step 76 moves the angle meters 58X and 58Y forward by half an angle table step 46X and 46Y, which reads the angles occurring between the stepping points. The angle meters 58X and 58Y, and the screen points 54X and 54Y are now set to enter the drawing loop.

Execution of the Two Dimensional Ellipse Drawing Loop

The angle meters 58X and 58Y are listed in FIG. 7 for the first few drawing steps of the ellipse 40 of FIG. 3. Comparator 77 looks at the angle meter 58X and the angle meter 58Y to determine which is lower. Pixel number 0 makes an X step. The angle meter 58X becomes the texture angle 63. The texture index 64 is obtained by shifting the texture angle 63 to the right 6 places, which is equivalent to division by 64. The pixel size 65 is the difference between successive texture angles 63. The brightness index 66 is obtained by shifting the pixel size 65 to the right 6 places. The texture index 64 and brightness index 66 combine to select a color 62 from the texture table 32. The pixel located at the screen point (54X, 54Y) is painted with a color 62. The angle table index 50X decrements by one angle table step 46X, and the angle meter 58X produces the rotation angle of the next point on circle diameter 44X. The screen point 54X increments by screen movement 56X.

Comparator 86 checks the progress of the curve. One check is to see if the texture angle 63 has been reached a desired angle span. This allows for an elliptical arc of any size to be drawn.

As the drawing loop continues to draw the ellipse, both angle meters 58X and 58Y have to checked for reaching a reversal point. When the angle table index 50X reaches the index 58X at the left end of the angle table 38, the screen point 54X is at the reversal point 67. Now the angle table index 50X is relocated to index 49X:

angle table index=angle table index +8,192−angle table step

In addition, the zero angle is modified to advance the angle reading by 8,192 microgees (or 180 degrees):

zero angle=zero angle−8,192 microgees.

This reversal of the angle table index 50X enables the angle table 38 to provide rotation angles for an entire back and forth movement along the circle diameter 44X.

The relationship between pixel size 65 and brightness index 66 is dependent on the circle diameters 44X and 44Y. The range of the brightness index 66 is described by the largest and smallest pixel sizes that occur along the ellipse. The pixel size 65 is divided by a number to obtain a brightness index 66 within the brightness resolution of texture table 32. In the example given, this divisor is 64. The divisor is chosen to be a binary number so the division can be performed with a binary right shift operation.

This drawing loop is designed for speed and accuracy. The operations require only additions, table lookups and comparisons. The angle meters 58X and 58Y provide an accuracy of one microgee (or 0.022 degrees), and can draw ellipses with a radius of up to 4096. Larger ellipses can be drawn by increasing the size of the angle table 38. For example, the angle table size could be increased to 16,384, and a microgee could be redefined to 32,768 in a circle.

Optionally, the size of the angle table 38 can be halved, because the arccos function is symmetrical around the 0 index.

Section II: Three Dimensional Ellipse Generation

The method for drawing an ellipse in two dimensions generates an elliptical path in X and Y space. This method can also generate an elliptical path in X, Y and Z space, simply by including an angle meter for the Z dimension of the ellipse. The translation of a three dimensional space path to a perspective screen path requires more work, however. A method which uses a perspective depth constant can perform this translation in a simple manner, and requires only simple operations in the drawing loop.

Description of the Depth Constant

The problem of drawing a line or a curve within the perspective field 102, shown in FIG. 8, is solved through the use of a carefully selected depth constant 110. The term depth constant describes the emphasis of holding a curve at a single, constant depth. The depth constant is strategically placed at a certain depth, or Z coordinate. The curve is allowed to step in one of six directions: +X, +Y, +Z, and −X, −Y, −Z. As will be shown, all of these six steps can be performed in a manner that maintains the correct perspective transformation from space to screen. In addition, the use of the depth constant 110 removes the problem of curve expansion that can result in drawing gaps where the curve moves closer to the viewer.

Consider a space point 109 located at (x, y, z). The space point 109 translates through the perspective formula [1] to a screen point 111. Let the movement of the space point 109 be restricted to six possible steps: +X, +Y, +Z, −X, −Y and −Z. A +X step affects only the screen point 111X coordinate, as can be seen by the perspective formula [1]. Suppose the space point 109 is located at a Z coordinate equal to the depth constant 110. Then the +X step moves the space point 109 to (x+1, y, z). The effect on the screen point 111X coordinate is:

X screen=(X space+1 space)*X view factor/depth constant which factors to:

X screen=(X space*X view factor/depth constant)+(1 space*X view factor/depth constant)

and can be written using the += operator as:

X screen+=X view factor/depth constant

This movement translation can be applied to the +X, +Y, −X and −Y steps. The movement amounts are called the screen travels 125X and 125Y:

$$\text{X screen travel} = \text{X view factor}/\text{depth constant} \qquad [2]$$

$$\text{Y screen travel} = \text{Y view factor}/\text{depth constant}$$

The +X, +Y, −X and −Y steps can be applied to the space point 109 even when the 109Z coordinate is not equal to the depth constant 110. The requirement is to scale the step size by the ratio (Z/depth constant). If the size of the X and Y steps can be maintained to follow this ratio, the X and Y screen travels can be applied to the screen point for all the X and Y steps. In drawing the curve, the steps are initially scaled to the depth constant, and the step sizes are rescaled whenever a Z step occurs.

Consider now the effect of a Z step, in which the Z coordinate of space point 109 changes by one step. When the Z step is positive, the change in the Z coordinate can be expressed as a step ratio (Z+1)/Z. Since the Z coordinate is effectively placed at the depth constant 110, this step ratio is (depth constant +1)/depth constant.

Recall from FIG. 8 that the depth constant 110 is chosen as a binary number equal to or greater than either X or Y view factors 108X and 108Y. Being a binary number means the depth constant 110 can be defined as two to a certain power. This power is called the depth exponent 112. Therefor, a number N can be multiplied by the step ratio through the use of binary shifting:

$$N = N*(\text{depth constant}+1)/\text{depth constant}$$

becomes $$N = (N*\text{depth constant})/\text{depth constant} + N/\text{depth constant}$$

becomes $$N = N + (N/\text{depth constant})$$

becomes $$N = N + (N >> \text{depth exponent})$$

becomes $$N\mathrel{+}= N >> \text{depth exponent}$$

This step ratio is used to rescale the variables that direct the drawing of a line or curve. The chief advantage of the depth constant is that the rescaling can be carried out using only additions, subtractions, and binary shifting. Division and multiplication operations are not needed within the drawing loop. An additional advantage is that the curve is drawn with no missing pixels, because the dimensions of the curve are rescaled as the curve makes Z steps. This keeps the curve correctly proportioned within the perspective field 102.

Description of Three Dimensional Line Generation

The depth constant 110 can be used to draw a straight line in perspective. This is illustrated here in order to provide an insight into the operation of the depth constant without complicating the drawing by any additional requirements. This example provides a clear demonstration that the depth constant is an acceptable method for perspective transformation. After the line generation is described completely, the perspective ellipse generation is shown to be built on the same concept. The perspective generation of the ellipse is more complex, though, because the ellipse generation requires the use of angle meters.

FIG. 10 is a flowchart for generating a line in three dimensions. The process is similar to the perspective ellipse generation, except that the angle meters are replaced with distance indices. The distance indices measure the progress of time as the pixel generator chooses steps in each of the three dimensions.

FIG. 12 is a numeric table of the entire line generation. Step 130 obtains the points A and C, and computes the line AC. Step 130 finds the distance steps 116X, 116Y, and 116Z with the formula distance step=4096/line length. The distance indices 120X, 120Y and 120Z are set to zero. The screen movements 126X, 126Y and 126Z are set to move from point A to point C.

Step 134 modifies the distance steps 116X, 116Y and 116Z by the ratio (A.z/depth constant). This enables the depth constant to take effect at point A. Two screen points 124X and 124Y are set at the point A' using perspective formula [1]. The screen points 124X and 124Y are listed in FIG. 12 with floating-point numbers. In the preferred embodiment, the screen points 124X and 124Y are stored as fixed-point numbers in 32 bit registers. The fixed-point form holds the integer portion in with the upper 16 bits and the decimal portion with the lower 16 bits. The advantage of using fixed-point numbers over floating-point numbers is that a reduction of complexity in math operations.

The screen travels 125X and 125Y are derived from formula [2] in FIG. 8. The screen movements 126X and 126Y are scaled by the screen travels 125X and 125Y. The Z actual depth 127 is set to the starting point A.z.

Step 136 moves the distance indices 120X, 120Y, and 120Z forward by half a distance step 116X, 116Y and 116Z to initialize the distance indices between the line points.

The pixel generator now enters the drawing loop. Comparator 137 finds which of the distance indices 120X, 120Y and 120Z is lower. Comparator 137 branches to step 140 for an X step, step 142 for a Y step, and step 144 for a Z step.

Step 140 plots a pixel at the integer portion of the screen points 124X and 124Y. The screen point 124X is incremented by the screen movement 126X. The distance index 120X increments by one distance step 116X. This completes the X move. Step 142 is similar to step 140, except for using Y terms instead of X terms.

Step 144 plots a pixel at the integer portion of the screen points 124X and 124Y. The distance index 120Z increments by one distance step 116Z. The depth rescaling step 146 follows.

Description of the Depth Rescaling Step

FIG. 11 shows the depth rescaling step 146 in detail. Comparator 150 determines which direction the screen movement 126Z is going, branching to step 152 if the screen movement 126Z is positive, or to step 154 if negative.

Step 154 performs the scaling in accordance with decrementing the depth constant 110 by one:

$$(\text{depth constant}-1)/\text{depth constant} = 255/256 \qquad [4]$$

Since the Z step is negative, the apparent size of the curve is growing. Therefor, the line size needs to be multiplied by the inverse of [4], or (256/255). The line size is essentially held by the distance steps 116X, 116Y and 116Z, and these are related to the line size by (4096/line size). Since the distance steps are inversely related to the line size, the distance steps are multiplied by the inverse of the inverse of the ratio [4], which reverts back to the ratio [4]:

$$\text{distance step} = \text{distance step}*(\text{depth constant}-1)/\text{depth constant} \qquad [5]$$

Formula [5] can be factored and rewritten:

$$\text{distance step} \mathrel{-}= \text{distance step}/\text{depth constant}.$$

The screen coordinates 124X and 124Y are affected by the Z step as well. The Z space decrements, which expands the screen coordinates 124X and 124Y according to formula [1]. The screen coordinates should therefore be multiplied by the ratio:

$$\text{depth constant}/(\text{depth constant}-1)=256/255=1.00392157. \qquad [6]$$

The divisor in formula [6] is not a binary number, so the division cannot be performed by a shift operation. But an acceptable substitution might be:

$$(\text{depth constant}+1)/\text{depth constant}=257/256=1.00390625. \qquad [7]$$

The difference between [6] and [7] is 0.00001532. This difference can be made smaller by adding another term into equation [7]:

$$(\text{depth constant}+1+(1/\text{depth constant}))/\text{depth constant} \qquad [8]$$

$$=(257+0.00390625)/256$$

$$=1.00392151.$$

Equation [8] is substantially similar to [6]. The difference between [6] and [8] is 0.00000006. Equation [8] can be factored as:

$$1+(1+(1/\text{depth constant}))/\text{depth constant} \qquad [9]$$

Multiplying the space coordinates 124X and 124Y by equation [9] produces:

$$\text{X screen point}+=(\text{X screen point}+(\text{X screen point}/\text{depth constant}))/\text{depth constant}$$

$$\text{Y screen point}+=(\text{Y screen point}+(\text{Y screen point}/\text{depth constant}))/\text{depth constant}. \qquad [10]$$

Step 154 in FIG. 11 writes the divisions in formula [10] with the right-shift operator >> and the depth exponent 112. The plus-equals operator += is used to denote addition to the existing term on the left hand side.

Maintaining Z actual depth 127 is important if the curve is being drawn over other objects. The Z actual depth decides whether the curve is on top and therefore visible on the screen. In the rescaling step 154 in which Z depth is decrementing, the Z actual depth 127 is multiplied by the ratio [4], which is equivalent to:

$$\text{Z actual depth}=\text{Z actual depth}-(\text{Z actual depth}/\text{depth constant}).$$

The accuracy of the perspective transformation can be seen by comparing the last plot location with the perspective point C':

| Plot 20 | Screen Pair | (58.7595, 35.2086) | actual depth | 321.2006 |
|---|---|---|---|---|
| Point C' | | (59.0156, 35.1682) | | 321.0000 |
| Arrival Accuracy | | (−0.2561, 0.0404) | | 0.2006. |

Description of Three Dimensional Ellipse Generation

FIG. 14 shows a flowchart for drawing an ellipse in three dimensions. The numeric values for the points A, B, C, and subsequent setup values are listed in FIG. 15. Step 230 obtains points A, B and C of the ellipse 40. Points A and B span 90 degrees (a quarter circle) in the plane of the ellipse. The two radial lines CA and CB define the size of the ellipse 40 in (x, y, z) space.

Step 232 sets up the angle meters 228X, 228Y and 228Z using CA as the starting location, and CB as the quarter point. The setup of the angle meters follows the setup of angle meter 58X, as described in step 72 of section I.

Step 234 modifies the angle table steps 216X, 216Y and 216Z by a factor equal to (A.z/depth constant). This enables the depth constant to take effect at point A. Two screen points 224X and 224Y are set at point A' using the perspective formula [1]. The screen points 224X and 224Y are listed in FIG. 15 with floating-point numbers. In the preferred embodiment, the screen pair 224 are stored as fixed-point numbers in 32 bit registers. The screen travels 125X and 125Y are derived from formula [2] in FIG. 8. The screen movements 226X and 226Y are scaled by the screen travels 125X and 125Y. The Z actual depth 227 is set to point A.z.

Step 236 decrements the angle table indices 220X, 220Y and 220Z by half an angle step 216X, 216Y and 216Z to find the angle readings that occur in-between the curve points.

Execution of the Three Dimensional Ellipse Drawing Loop

FIG. 15 lists the numeric values of the first 16 screen plots along the perspective ellipse 260. Plot number 0 has a lower angle for the angle meter 228Z, and branches to step 244 to make a Z step. The angle meter 228Z becomes the texture angle 238. The texture index 239 is obtained by shifting the texture angle 238 to the right 6 places, which is equivalent to division by 64. The texture index 238 selects a color from the texture table 32. The pixel located at the integer portion of screen point (224X, 224Y) is painted with the selected color. The angle table index 220Z decrements by one angle table step 216Z to obtain the rotation angle of the next point on circle diameter 214Z. A depth rescaling step 246 completes the Z step. This rescaling step is similar to step 146 of the line generation, shown in FIG. 11. The angle table steps 216X, 216Y and 216Z substitute in for the distance steps 116X, 116Y and 116Z.

Comparator 248 checks for completion of the ellipse 260. Curve completion can be detected in a number of ways. One check is to see if the angle meters 228X, 228Y and 228Z have reached a certain angle. This stops the drawing of the ellipse at a certain angle span. Another check is to see if the screen point 224X and 224Y have moved off the bounds of the display screen 100. This allows the curve to be clipped.

Plot number 1 is an X step. The angle meter 228X becomes the texture angle 238. The texture index 239 is obtained by shifting the texture angle to the right 6 places, which is equivalent to dividing by 64. The texture index 238 selects a color from the texture table 32. The pixel located at the screen points 224X and 224Y is painted with the selected color. The angle meter 228X advances one angle table step 216X to obtain the rotation angle of the next point on circle diameter 214X. The screen point 224X increments by screen movement 226X. This completes the X step.

Plot number 2 is a Z step, and follows step 244 and step 246, as described above.

Plot number 3 is a Y step, which is like the X step described above. Note that plot number 3 re-paints the pixel painted by plot number 2. The simplest way to deal with this is to let the rewriting occur. If the curve is being antialiased, though, the previous pixel brightness is mixed in to sustain correct antialiasing.

Improvement in Efficiency and Accuracy of Perspective Generation

An important improvement in drawing efficiency can be achieved by avoiding pixel rewrites for X and Y steps. The aim is to make the screen travels 125X and 125Y equal to 1.0000 in a manner that preserves the use of the depth constant 110. Recall from formula [2] that the screen travel 125X equals the view factor 108X divided by the depth constant 110. Since the screen travel 125X is 1.0000, all X steps move the screen point 224X to a new pixel. The screen travel 125Y is 0.8320, however, so every Y step does not necessarily move the screen point 224Y to a new pixel. This results in pixel rewrites. These pixel rewrites can be avoided by multiplying the angle table step 216Y by the ratio (depth constant/Y view factor) in step 234, before entering the drawing loop. Now the screen travel 125Y can be set to 1.0000. This principle can be applied to both the X and Y angle meters whenever the perspective field 102 has a depth constant 110 that does not equal the view factor 108X or 108Y. Screen pixel rewriting cannot be entirely avoided, though, because Z steps won't always move the screen point 224X and 224Y to a new pixel.

Although the depth constant can accurately generate a perspective curve, individual screen points may be inaccurately placed. This is due to the way the curve is generated in steps. This inaccuracy becomes noticeable when the ellipse is moved around in space to create an animation sequence, and appears as curve jitter. This jitter can be noticeably improved by refining the drawing steps. The refinement can be achieved by halving the angle table steps 216X, 216Y and 216Z in step 234, before entering the drawing loop. This results in twice as many drawing steps, but the drawing steps will be more tightly intertwined, and therefor more accurate. This refinement technique requires that the screen travels 125X and 125Y are halved as well, and that the depth exponent 112 used in the rescaling operation is incremented by one.

Another method of reducing the jitter of an animated perspective ellipse is to anchor the elliptical curve at the X, Y and Z reversal points. An anchor point is made by calculating the space coordinate of an ellipse point. This can be done using the angle of rotation of each angle meter, and using a cosine function to compute the space coordinate. Specifically, the X space coordinate is (cos[X rotation angle] * X circle radius). The space coordinate is then translated to a perspective anchor point using formula [1]. The screen points 224X and 224Y are set to this anchor point. This provides a noticeable reduction in jitter, and can be used in place of, or along with, the step refinement technique described above.

Conclusions, Ramification, and Scope

Accordingly, it can be seen that the above described system allows one to generate new and useful presentations of elliptical curves which can contain color texture information, brightness anti-aliasing, and perspective transformation, with speed, accuracy and simplicity.

While the above description contains many specificities, they should be construed as examples of several preferred embodiments thereof, and not as limitations of the scope of the invention. Various other embodiments and ramifications are possible within context of the scope.

The angle table steps might be modified by additional terms in the course of drawing to allow fluid re-shaping of the curve. This could create a more complex curve whose shape changes as a function of angle rotation. For example, a spiral is an ellipse whose size is continually shrinking. This technique could be used to draw an ellipse with radial variations. If several such shaped ellipses are drawn together by stacking them along an axis, a globe can be drawn with a surface terrain that simulates mountain ranges.

The shape of the arccos curve stored in the angle table may be altered to influence the shape of the curve. Or, an arcsin table could be used in place of an arccos table, since these are reciprocal trigonometric functions. Or, the angle table could be dispensed with, and the angle values computed as step by step as needed.

The drawing method could be modified to move the screen point by a straight line in addition to an ellipse, which would produce a helix spiral. This could be used as an additional illustration tool to show complex chemical mechanisms.

The system can be modified to paint shadow information on the color texture by employing a brightness function on the texture angle. This would add significant visual information to the color texture of along curve.

Thus the scope of the invention should be determined by the appended claims and their legal equivalents, rather than by the examples given.

What is claimed is:

1. A computerized method for generating a line in two or more space dimensions, on a graphics display having a pixel matrix, each pixel being addressed by two-dimensional screen coordinates, said graphics display having a color palette, said pixels storing color values for the purpose of selecting a specified color from said color palette, said method comprising the steps of:

(a) determining two X and Y view factors for said graphics display screen as a function of said pixel matrix dimensions and a perspective field of view;

(b) deriving a depth constant from said X and Y view factors, said depth constant being a binary number;

translating a known starting point on said line to a screen point using said perspective field of view, said starting point being defined in X, Y and Z space, and said screen point having X and Y coordinates on said graphics display;

means for obtaining a series of X, Y and Z step movements along said line;

transforming said X and Y step movements along said line into perspective by incrementing or decrementing said X and Y screen point coordinates;

transforming said Z step movements along said line into perspective by employing a depth rescaling ratio, said depth rescaling ratio being based on said depth constant.

2. A method according to claim 1, further including:

means for refining said X, Y and Z steps;

whereby said X, Y and Z steps along said line attain an increase in accuracy.

3. A method according to claim 1, further including:

means for defining several anchor points along said line;

whereby said line is drawn with increased accuracy on said graphics display.

4. A method according to claim 1, further including:

employing two or more rotation angle meters, each of said angle meters providing a rotational angle for one space dimension of an ellipse;

placing a screen point on said pixel matrix at a starting point of said ellipse, storing a color value at said screen point;

comparison means for choosing a step direction along said elliptical curve, said comparison means employing said angle meters, said step directions being aligned with said space dimensions of said ellipse;

whereby an ellipse is drawn in perspective on said graphics display.

5. A method according to claim 4, wherein color texture information is painted on said elliptical curve according to said angle meters.

6. A method according to claim 4, wherein color texture information is modified according to said angle meters to provide shading, whereby a shadow can be drawn on said ellipse to simulate light cast from a point light source.

7. A method according to claim 4, wherein said color texture information is modified according to said angle meters to provide anti-aliasing, whereby said ellipse is drawn on said graphics display with an apparent reduction of curve jaggedness.

8. A method according to claim 4, further including means for combining a line with said ellipse, said ellipse being defined in two or more space dimensions, said means selecting said X, Y and Z steps to create a path combining said line and said ellipse;

whereby a helix is drawn with perspective in said graphics display.

9. A method according to claim 4, further including:

means for modifying said angle meters of said ellipse, said means relying on said rotation angle of said angle meters;

whereby a spiral is drawn in perspective on said graphic display.

10. A method according to claim 4, further including:

means for combining a second ellipse with said first ellipse, said second ellipse being defined by two or more angle meters, said means selecting said X, Y and Z steps to create a path combining said second ellipse and said first ellipse;

whereby a complex curve is drawn with perspective on said graphics display.

* * * * *